US012412111B2

United States Patent
Bogachev et al.

(10) Patent No.: US 12,412,111 B2
(45) Date of Patent: Sep. 9, 2025

(54) SYSTEMS AND METHODS FOR PROBABILISTIC FORECASTING OF EXTREMES

(71) Applicant: University of Leeds, Leeds (GB)

(72) Inventors: Leonid Bogachev, Leeds (GB); János Gyarmati-Szabó, Zürich (CH)

(73) Assignee: University of Leeds, Leeds (GB)

( * ) Notice: Subject to any disclaimer, the term of this patent is extended or adjusted under 35 U.S.C. 154(b) by 602 days.

(21) Appl. No.: 17/843,129

(22) Filed: Jun. 17, 2022

(65) Prior Publication Data
US 2023/0408991 A1    Dec. 21, 2023

(51) Int. Cl.
*G06N 7/01*       (2023.01)
*G05B 13/02*      (2006.01)
(Continued)

(52) U.S. Cl.
CPC ............ *G06N 7/01* (2023.01); *G05B 13/027* (2013.01); *G05B 13/048* (2013.01); *G06F 17/18* (2013.01); *G06N 3/047* (2023.01)

(58) Field of Classification Search
CPC ..... G05B 13/027; G05B 13/048; G06F 17/18; G06N 3/045; G06N 3/0464; G06N 3/08;
(Continued)

(56) References Cited

U.S. PATENT DOCUMENTS 10,488,556 B2 * 11/2019 Kodra ............... G01W 1/06
2015/0235143 A1    8/2015 Eder
(Continued)

FOREIGN PATENT DOCUMENTS

CN    112734129 B    9/2021
EP    3127054 A1    2/2017
(Continued)

OTHER PUBLICATIONS

International Searching Authority/US: Notification of Transmittal of the International Search Report and the Written Opinion of the International Searching Authority, or the Declaration, mailed Sep. 11, 2023 in International Application No. PCT/US2023/025279, 9 pages.
(Continued)

*Primary Examiner* — Crystal J Barnes-Bullock
(74) *Attorney, Agent, or Firm* — Sunstein LLP

(57) ABSTRACT

A computer-implemented method for producing probabilistic forecasts of extreme values. The method comprises obtaining input data comprising a plurality of signals of interest and a plurality of covariates associated therewith, each covariate of the plurality of covariates having an associated data type. The method further comprises performing a first forecast based on the input data. Performing the first forecast comprises: obtaining one or more trained machine learning models, each trained machine learning model of the one or more trained machine learning models having been trained to map one or more covariates of a respective data type to one or more surrogate covariates; mapping, using the one or more trained machine learning models and the input data, the plurality of covariates to one or more surrogate covariates, the one or more surrogate covariates corresponding to a compressed representation of the input data; fitting a statistical model of extremes to the plurality of signals of interest and the one or more surrogate covariates thereby generating a fitted statistical model of extremes, the statistical model of extremes being defined according to a predetermined distribution having a plurality of parameters; and obtaining a probabilistic forecast of future extreme values based on the fitted statistical model of extremes for one or more future time steps. The method
(Continued)

further comprises causing control of a controllable system based at least in part on the probabilistic forecast of future extremes.

18 Claims, 19 Drawing Sheets

(51) Int. Cl.
    *G05B 13/04*     (2006.01)
    *G06F 17/18*     (2006.01)
    *G06N 3/047*     (2023.01)

(58) Field of Classification Search
    CPC ............ G06N 7/01; G06N 7/08; G06N 3/047; G01W 1/06; G01W 1/10
    USPC .................................. 700/29; 706/11, 45, 48
    See application file for complete search history.

(56) References Cited

U.S. PATENT DOCUMENTS

| | | | |
|---|---|---|---|
| 2017/0176640 A1 | 6/2017 | Kodra et al. | |
| 2019/0244680 A1 | 8/2019 | Rolfe et al. | |
| 2020/0410403 A1 | 12/2020 | Kamulete | |
| 2022/0018906 A1 | 1/2022 | Brown | |

FOREIGN PATENT DOCUMENTS

| | | |
|---|---|---|
| GB | 2491564 A | 12/2012 |
| GB | 2574233 A | 12/2019 |

OTHER PUBLICATIONS

Davison, A. C. and Smith, R. L. Models for exceedances over high thresholds. Journal of the Royal Statistical Society, Series B (Methodological), 52 (1990), pp. 393-442.
Dawkins, L. Predicting the likelihood and frequency of extreme weather. [Online]. Met Office. [Accessed Aug. 16, 2022]. Available from: https://www.metoffice.gov.uk/services/insights/predicting-extreme-weather.
Dubey, P. and Müller, H.-G. Functional models for time-varying random objects. Journal of the Royal Statistical Society, Series B (Methodological), 82 (2020), pp. 275-327; Errata: 83 (2021), p. 883.
Eastoe, E.F. and Tawn, J.A. Modelling non-stationary extremes with application to surface level ozone. Journal of the Royal Statistical Society, Series C (Applied Statistics), (2009) 58, pp. 25-45.
Falk, M. and Guillou, A. Peaks-over-threshold stability of multivariate generalized Pareto distributions. Journal of Multivariate Analysis, 99 (2008), pp. 715-734.
Fong, E., Holmes, C. and Walker, S.G. Martingale posterior distributions. Preprint, arXiv:2103.15671, 2021.
Fougères, A.-L. Multivariate extremes. In Extreme Values in Finance, Telecommunications, and the Environment (Finkenstadt, B. and Rootzén, H., eds.), pp. 373-388. 2003. Chapman & Hall/CRC, New York.
Gyarmati-Szabó, J., Bogachev, L.V. and Chen, H. Nonstationary POT modelling of air pollution concentrations: Statistical analysis of the traffic and meteorological impact. Environmetrics 28 (2017), No. 5, Paper e2449.
Gyarmati-Szabó, J., Bogachev, L.V. and Chen, H. Modelling threshold exceedances of air pollution concentrations via nonhomogeneous Poisson process with multiple change-points. Atmospheric Environment 45 (2011), pp. 5493-5503.
Gyarmati-Szabó, J. and Bogachev, L.V. Simulation of the logistic multivariate generalized Pareto distribution. In: Absrtacts of Communications, Int. Workshop "Environmental Risk & Extreme Events" (Ascona, Switzerland, Jul. 10-15, 2011).
Gyarmati-Szabó, J. and Bogachev, L.V. Simulation of the multivariate generalized Pareto distribution of logistic type. In: Márkus, L. and Prokaj, V. (eds.), Abstracts of the 29th European Meeting of Statisticians (Budapest, Hungary, Jul. 20-25, 2013), pp. 127-127.
Heffernan, J.E. and Tawn, J.A. A conditional approach for multivariate extreme values. Journal of the Royal Statistical Society, Series B (Statistical Methodology), 66 (2004), pp. 497-546.
Kiriliouk, A., Rootzen, H., Segers, J. and Wadsworth, J.L. Peaks over thresholds modeling with multi-variate generalized Pareto distributions. Technometrics, 61 (2019), pp. 123-135.
Liu, H., Aivaliotis, G. and Houwing-Duistermaat, J. On estimation of the effect lag of predictors and prediction in functional linear model. Preprint, arXiv:1907.09808, 2019.
Liu, H. and Houwing-Duistermaat, J. On trend and its derivatives estimation in repeated time series with subordinated long-range dependent errors. Preprint, arXiv:1803.05411, 2018.
Northrop, P. J., Attalides, N. and Jonathan, P. Cross-validatory extreme value threshold selection and uncertainty with application to ocean storm severity. Journal of the Royal Statistical Society, Series C (Applied Statistics), 66 (2017), pp. 93-120.
Rootzén, H. and Tajvidi, N. Multivariate generalized Pareto distributions. Bernoulli, 12 (2006), pp. 917-930.
Rootzén, H., Segers, J. and Wadsworth, J.L. Multivariate peaks over thresholds models. Extremes, 21 (2018), pp. 115-145.
Rootzén, H., Segers, J. and Wadsworth, J.L. Multivariate generalized Pareto distributions: Parametrizations, representations, and properties. Journal of Multivariate Analysis, 165 (2018), pp. 117-131.
Wang, J.-L., Chiou, J.-M. and Müller, H.-G. Functional Data Analysis. Annual Review of Statistics and Its Application, 3 (2016), pp. 257-295.
Silius M Vandeskog et al, Modelling sub-daily precipitation extremes with the blended generalised extreme value distribution, arxiv.org, Cornell University Library, 201 Olin Library Cornell Ithaca, NY 14853, May 21, 2022.
Thijssen Bram et al, Approximating multivariate posterior distribution functions from Monte Carlo samples for sequential Bayesian inference, PLOS One, 15(3), 13 March 202, p. e0230101.
Wang Hui et al, A novel non-homogeneous hidden Markov model for simulating and predicting monthly rainfall, Theoretical and Applied Climatology, 143(1-2), Oct. 28, 2020, pp. 627-638.
Kirkwood Charlie et al, Bayesian Deep Learning for Spatial Interpolation in the Presence of Auxiliary Information, Mathematical Geosciences, 54(3), Jan. 17, 2022, pp. 507-531, Springer, Berlin Heidelberg.

\* cited by examiner

SYSTEMS AND METHODS FOR PROBABILISTIC FORECASTING OF EXTREMES

TECHNICAL FIELD

The present disclosure relates to producing probabilistic forecasts of extreme values. Particularly, but not exclusively, the present disclosure relates to producing a probabilistic forecast of extreme values based on a statistical model of extremes fitted to data comprising signals of interest and associated covariates. More particularly, but not exclusively, the present disclosure relates to causing control of a controllable system based on a probabilistic forecast of extreme values.

BACKGROUND

Mainstream statistics is concerned with typical values of random samples. Such statistics build on concepts like mean and standard deviation using approximations based on a normal distribution. However, in many areas of application the population from which the data is sampled may be nonhomogeneous such that the concepts of mean and standard deviation have little meaning. Moreover, rare fluctuations (so called large deviations) may occur with a relatively small probability but have large and serious consequences. For example, hyperglycaemia (i.e., high blood sugar levels) may only occasionally occur for people with diabetes, but when a hyperglycemic episode does occur, it can cause potentially serious complications.

Extreme Value Theory (EVT) presents an alternative approach to mainstream statistics. EVT focusses on extreme, rather than typical, values in the data and can reveal "hidden" tail properties of the data. In contrast to mainstream statistics, EVT models only the extreme observations in a data set. That is, rather than model the entire data set, only the "extreme values", or "rare events", are modelled and used for further analysis. What constitutes an extreme value, or a rare event, is defined according to the approach used to identify extreme values.

FIGS. 1A and 1B illustrate two approaches for estimating extreme values within time series data.

FIG. 1A shows a first time-series plot 100 comprising a first plurality of time-based observations. The first time-series plot 100 shows a first plurality of extreme values 102, 104, 106 and a block 108. The first plurality of extreme values 102, 104, 106 correspond to a subset of the plurality of time-based observations determined according to the block maxima approach.

The block maxima approach divides the data into several, sufficiently large, blocks and selects the maximum value within each block. In the example shown in FIG. 1A, the block 108 is shown between time points "a" and "b". The extreme value for the block 108 (i.e. block a-b) is the value 102. Similarly, the values 104 and 106 represent the extreme values for blocks b-c and c-d respectively.

FIG. 1B shows a second time-series plot 110 comprising a second plurality of time-based observations. The second time-series plot 110 shows a second plurality of extreme values 112-130 determined according to the peaks-over-threshold (POT) approach based on a threshold 132.

The POT approach specifies a preferably large threshold such that only those values which exceed the threshold are considered extreme values for analysis and modelling. In the example shown in FIG. 1B, the values 112-130 are identified as exceeding the threshold 132 (i.e., the values are deemed to be threshold exceedances). As can be seen, the POT approach shown in FIG. 1B captures a larger number of extreme values than the block maxima approach shown in FIG. 1A.

By identifying extreme values within a time-series based dataset (e.g., using the block maxima or POT approach), the extreme values can be used for further modelling and analysis. Typically, this involves fitting a statistical model of extremes to estimate the distribution of extreme values. This distribution is then used to forecast future extreme values.

EVT can be applied to solve technical problems across a range of different technological applications. For example, within the domain of environmental monitoring, EVT can be used to predict the future concentration of pollutants in the atmosphere. Within the healthcare domain, EVT can be used to predict important biophysical quantities such as glucose level, heartbeat, and the like. Within the domain of financial modelling, EVT can be used to predict the future price of a financial asset.

However, existing approaches to EVT typically rely on the data being univariate and stationary. That is, only a single variable is considered, the statistical properties of which do not vary over time. In many applications, such as those listed above, the data is often multivariate and highly non-stationary. Applying existing univariate stationary approaches to these applications will thus limit the accuracy and efficacy of any models and predictions. Moreover, existing techniques for handling multivariate and non-stationary data typically rely on modelling the observations as functions of time dependent covariates. As the number of covariates increases, as is the case in many real-world applications, the complexity of the EVT model increases thus decreasing the computational efficiency. This severely limits the application areas to which such EVT models can be applied.

There is therefore a need for efficient and accurate approaches to forecasting extreme values for multivariate and non-stationary data.

SUMMARY OF INVENTION

According to an aspect of the present disclosure there is provided a computer-implemented method for producing probabilistic forecasts of extreme values. The method comprises obtaining input data comprising a plurality of signals of interest and a plurality of covariates associated therewith, each covariate of the plurality of covariates having an associated data type; performing a first forecast based on the input data, wherein performing the first forecast comprises: obtaining one or more trained machine learning models, each trained machine learning model of the one or more trained machine learning models having been trained to map one or more covariates of a respective data type to one or more surrogate covariates; mapping, using the one or more trained machine learning models and the input data, the plurality of covariates to one or more surrogate covariates, the one or more surrogate covariates corresponding to a compressed representation of the input data; fitting a statistical model of extremes to the plurality of signals of interest and the one or more surrogate covariates thereby generating a fitted statistical model of extremes, the statistical model of extremes being defined according to a predetermined distribution having a plurality of parameters; and obtaining a probabilistic forecast of future extreme values based on the fitted statistical model of extremes for one or more future time steps; and causing control of a controllable system based at least in part on the probabilistic forecast of future extremes.

Further aspects of the present disclosure are set out in the appended set of claims.

BRIEF DESCRIPTION OF DRAWINGS

The present disclosure will now be described by way of example only with reference to the accompanying drawings in which.

DETAILED DESCRIPTION

Embodiments of the present disclosure will be now described with reference to the attached figures. It is to be noted that the following description is merely used for enabling the skilled person to understand the present disclosure, without any intention to limit the applicability of the present disclosure to other embodiments which could be readily understood and/or envisaged by the reader. In particular, whilst the present disclosure is primarily directed to producing probabilistic forecasts of extreme values for application within healthcare or environmental monitoring settings, the skilled person will readily appreciate that the systems, methods, and devices of the present disclosure are applicable to other application domains such as industrial control systems, personal device monitoring, and security monitoring.

Figure 2:
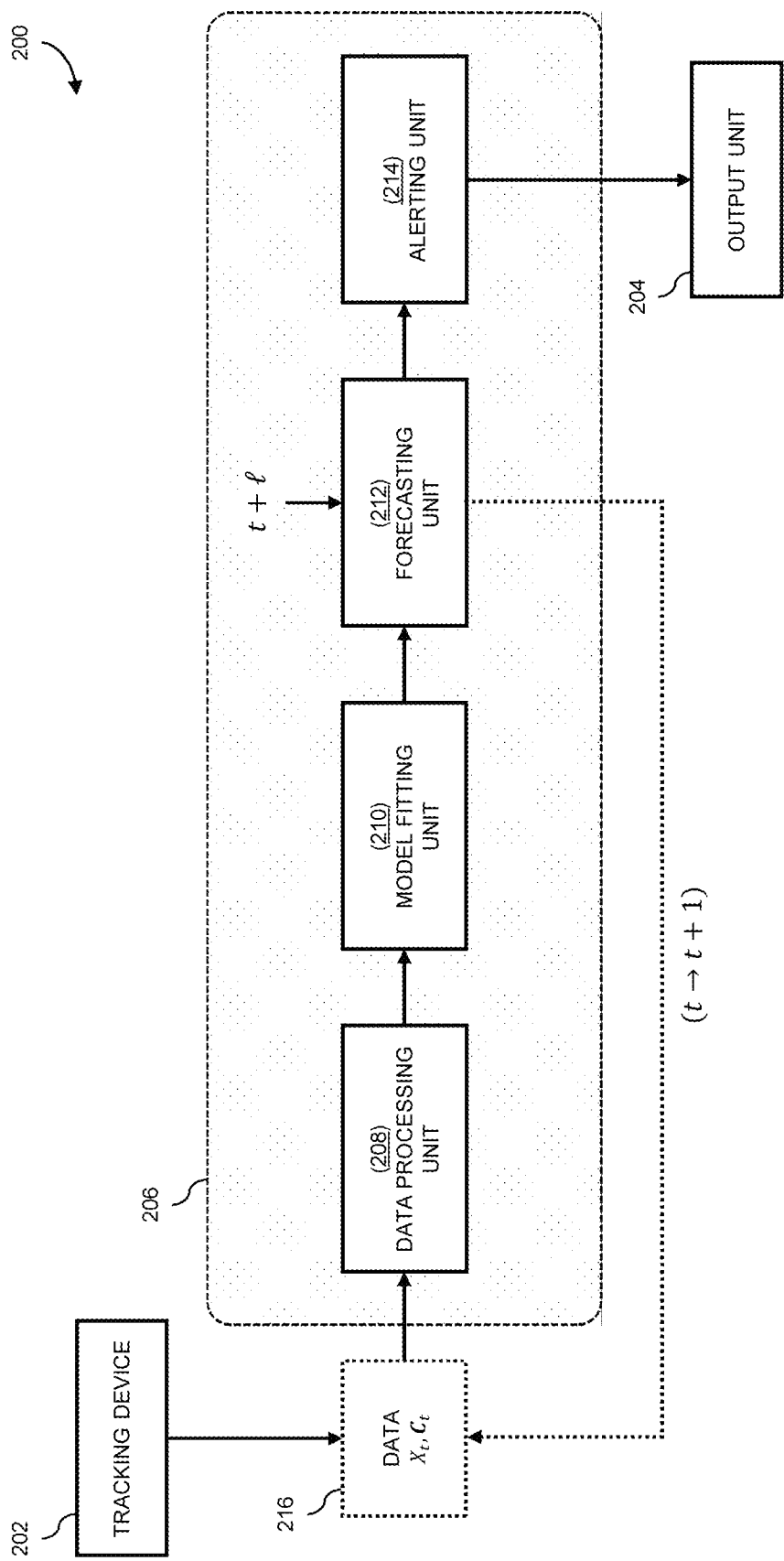
FIG. 2 shows a system for forecasting extreme values according to an aspect of the present disclosure.

FIG. 2 shows a system 200 for forecasting extreme values according to an aspect of the present disclosure.

The system 200 comprises a tracking device 202, an output unit 204, and a control device 206. The control device 206 comprises a data processing unit 208, a model fitting unit 210, a forecasting unit 212, and an alerting unit 214. In some embodiments, the data processing unit 208 and the model fitting unit 210 form a part of the forecasting unit 212. The control device 206 is communicatively coupled to the tracking device 202 and the output unit 204. FIG. 2 further shows data 216 received from the tracking device 202 at time step t and communicated to the control device 206.

In general, the system 200 is operable, at time step t, to receive data 216 from the tracking device 202 and determine a probabilistic forecast of extreme values at a future time step $t+\ell$. Based on this probabilistic forecast, an alert may be issued to the output unit 204 by the alerting unit 214.

Specifically, the data processing unit 208 receives data 216 from the tracking device 202 and performs further processing of this input data. One or more machine learning models are used to transform covariates of the input data to a compressed representation thereof. For example, the compressed representation may have reduced dimensionality and/or be encoded to a smaller representation (i.e., fewer bits). The model fitting unit 210 fits a statistical model of extremes to the input data and the compressed representation. The forecasting unit 212 produces a probabilistic forecast of future extreme values based on the fitted statistical model of extremes. The alerting unit 214 analyses the probabilistic forecast of future extreme values produced by the forecasting unit 212 and, in accordance with a determination that the probabilistic forecast of future extreme values is indicative of a predicted extremal state occurring at one or more future time steps, causes an alert to be issued, via the output unit 204, to notify a user of the predicted extremal state.

As will be described in more detail below, the system 200 provides an efficient process for producing probabilistic forecasts of extreme values. As such, the system 200 may be employed within settings which require online forecasting of extreme values—i.e., applications whereby data is continuously received and used to update the model for forecasting extreme values. Moreover, the system 200 allows forecasting of extreme values to be made for both univariate or multivariate and stationary or non-stationary data, thus enabling the systems and methods to be employed within a wide range of problem domains. In addition, multivariate modelling of extremes allows clusters of extreme events to be modelled. This is important in many practical situations, whereby the significant outcomes of extremes are caused not by a single shock but by a sequence of relatively moderate shocks (e.g., a bridge breaking down under repeated flood waves, or the healthcare system overstretched by several days in a row of elevated hospital admissions, etc.). To imbed clusters into a multivariate modelling framework, $\ell$-tuples of consecutive values of the signal, $Y_t = (X_t, \ldots, X_{t+\ell-1})$, are considered with a required cluster size $\ell$, to which any suitable multivariate extreme value method can be applied, such as multivariate block maxima or multivariate peaks-over-threshold (POT) methods (as described in more detail below).

Method (300) for Producing Probabilistic Forecasts of Extreme Values

Figure 3:
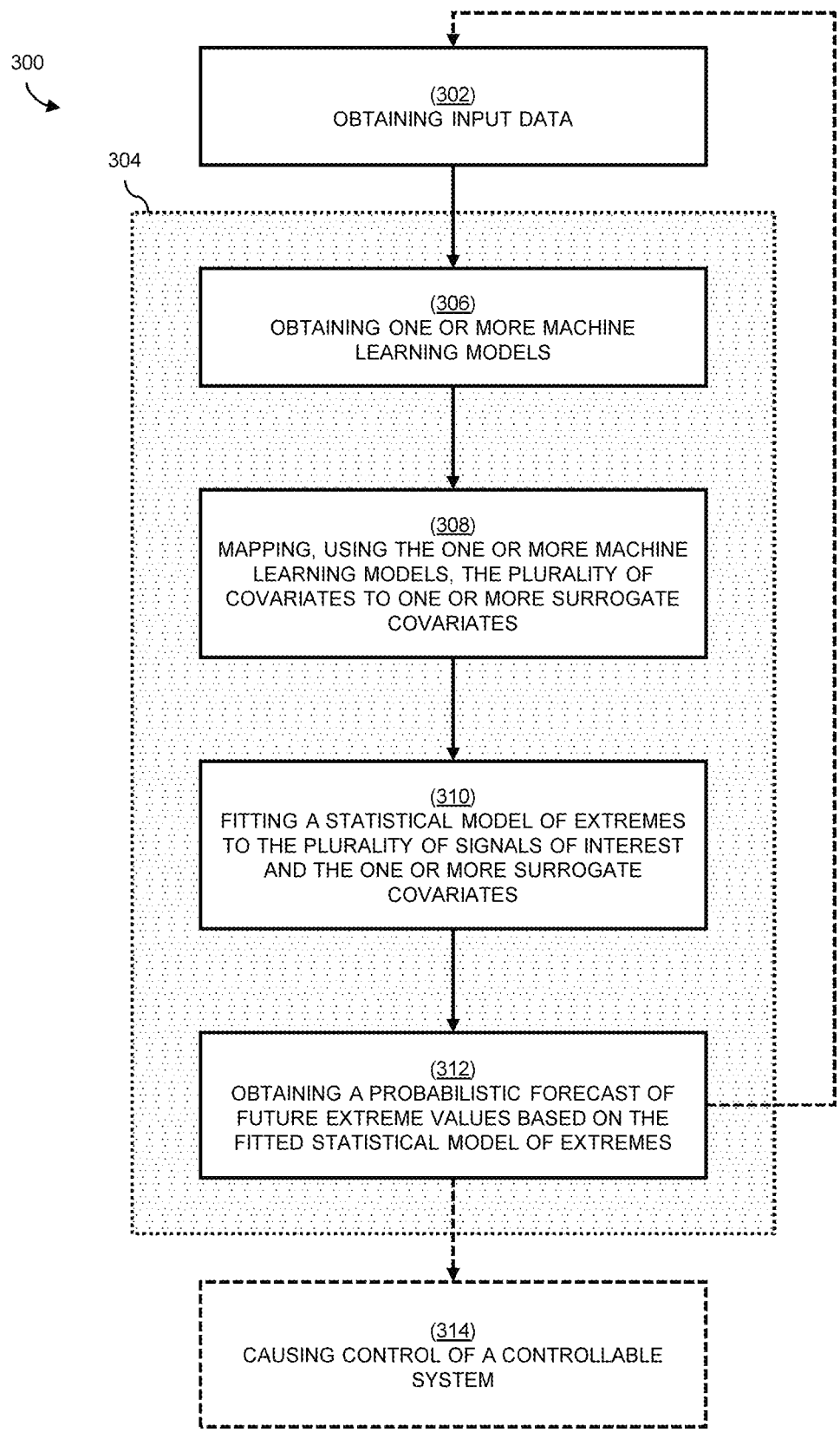
FIG. 3 shows a method performed by the system of FIG. 2 for producing probabilistic forecasts of extreme values according to an aspect of the present disclosure.

FIG. 3 shows a method 300, performed by components of the system 200 of FIG. 2, for producing probabilistic forecasts of extreme values according to an aspect of the present disclosure.

The method 300 comprises the steps of obtaining 302 input data comprising a plurality of signals of interest and a plurality of covariates associated therewith. The method 300 further comprises performing 304 a first forecast by obtaining 306 one or more machine learning models, mapping 308 the plurality of covariates to one or more surrogate covariates using the one or more machine learning models, fitting 310 a statistical model of extremes to the plurality of signals of interest and the one or more surrogate covariates, and obtaining 312 a probabilistic forecast of future extreme values based on the fitted statistical model of extremes. Optionally, the method 300 further comprises causing 314 control of a controllable system based on the probabilistic forecast of future extreme values.

The method 300 is performed by the control device 206 of FIG. 2. Specifically, the data processing unit 208 is configured to perform the steps of obtaining 302, performing 304, and mapping 308. The model fitting unit 210 is configured to perform the step of fitting 310, and the forecasting unit 212 is configured to perform the step of obtaining 312. The alerting unit 214 is configured to perform the step of causing 314.

Step 302: Obtaining Input Data

The method 300 comprises the step of obtaining 302 input data. The input data comprises a plurality of signals of interest and a plurality of covariates associated therewith. Each covariate of the plurality of covariates has an associated data type.

The signals of interest correspond to the observations to be modelled and forecast. For example, the plurality of signals of interest may correspond to glucose levels, heart rate, concentration of atmospheric pollutants, voltage level, plant control parameters, and the like. As such, the signals of interest may alternatively be referred to as signals, observations, or values. The signals of interest are either univariate or multivariate. A univariate signal of interest comprises only a single variable (i.e., a single dimension), whilst a multivariate signal of interest comprises multiple variables (i.e., a plurality of dimensions). Moreover, the signals of interest are either stationary or non-stationary. In the stationary case, the statistical properties of the signal do not vary over time; for the non-stationary case, the statistical properties of the signal may vary over time.

The covariates are typically time-dependent such that they are associated with the signals of interest at every time step. That is, each covariate temporally corresponds to one or more signal of interest. Unlike the signals of interest, the covariates may be obtained from numerous different sources and thus correspond to a range of different data types. For example, within an environmental monitoring setting, the covariates may include, for a given time point or period, meteorological data, traffic data, satellite imagery data, and the like, associated with the signals of interest. Each of these different data have a different data type such as float, integer, factor, image data types (e.g., a matrix or tensor of integer or float values), and the like. Therefore, each covariate is associated with a different data type such that the plurality of covariates comprises multiple data types.

The input data may be obtained in several different ways. In one example, the input data is obtained by reading the plurality of signals of interest and the plurality of covariates from one or more files stored on a computer-readable medium. The plurality of signals of interest and different portions of the plurality of covariates may be stored in different files. For example, the plurality of signals of interest may be stored in a first file, covariates related to one data type may be stored in a second file, and covariates related to another data type may be stored in a third file. In an alternative example, the input data is obtained by reading a portion of a data stream or reading only portion(s) of file(s) relating to the different data.

Step 304: Performing a First Forecast

The method 300 further comprises the step of performing 304 a first forecast based on the input data.

In general, a first forecast (or any forecast performed thereafter) involves producing a probabilistic forecast of extremes at one or more future time steps based on a statistical model fitted to the input data. The statistical model is defined by a distribution, the parameters of which are automatically estimated from the input data. To account for the high-dimensionality and complexity of the covariates included in the input data, one or more machine learning models are used to generate a compressed representation of the covariates, referred to as the surrogate covariates. By fitting the statistical model on the surrogate covariates, the model can be fitted more efficiently thereby allowing the forecast to be performed in an online manner and with reduced computational resources. That is, rather than requiring the data to be provided in batch, the data can be provided in an online manner over a number of different iterations. This means that the method 300 may be used in a wide variety of application areas such as those which use high-dimensional, high-complexity, input data over relatively short intervals (e.g., real time or near real time applications), and those which operate in a reduced computation environment (e.g., edge computing).

The forecasting process may be repeated across multiple time steps. At each subsequent time step, the statistical model is updated based on newly obtained input data. As described in more detail below, the model is updated without requiring the model to be fitted from scratch. This improves the efficiency of the forecasting process.

As such, in an embodiment, the method 300 further comprises the step of obtaining further input data and performing a second forecast based on the further input data. Therefore, references below to operations performed as part of the first forecast are equally applicable to operations performed as part of a second forecast. Indeed, the forecasting may be repeated any number of times using further input data with the steps and operations described in relation to the first forecast being equally applicable thereto.

Step 306: Obtaining One or More Trained Machine Learning Models

As stated above, to account for the high-dimensionality and complexity of the covariates included in the input data, the covariates are processed using one or more machine learning models to provide a compressed representation of the covariates, referred to as surrogate covariates. Therefore, the method 300 further comprises, as part of the first forecast, obtaining 306 one or more trained machine learning models. Each trained machine learning model of the one or more trained machine learning models having been trained to map one or more covariates of a respective data type to one or more surrogate covariates.

The trained machine learning models not only provide a compressed representation of the covariates, but also allow multiple different data types to be combined into a single set of surrogate covariates. The plurality of input covariates may comprise covariates obtained from different sources having different data types. For example, the covariates could include text data, image data, time-series data, and the like, all associated with the signals of interest. The wide range of different data types not only leads to a high-dimensional input space, but also presents difficulties when seeking to combine these data into a usable form. By utilising different machine learning models for different data types, covariates from different sources can be combined into a single usable compressed representation.

The one or more trained machine learning models comprise any suitable machine learning model. Although referred to as trained machine learning models, the underlying algorithms or models of the trained machine learning models may be supervised or unsupervised. Thus, the trained machine learning models may alternatively be referred to simply as machine learning models. In one embodiment, the one or more machine learning models comprise one or more unsupervised models. Examples of such models include, but are not limited to, empirical mode decomposition (EMD), principal components analysis (PCA), singular value decomposition (SVD), manifold learning (e.g., Isomap, locally linear embedding, etc.), and the like. Each model may be assigned to process a different data type. For example, an EMD model may be used to process time-series data whilst PCA may be used to handle image-based data.

In one embodiment, the one or more machine learning models comprise one or more supervised models. Examples of such models include, but are not limited to, support vector machines (SVMs), decision trees and random forests, regression models (e.g., Bayesian regression, linear regression, etc.), and the like. In an embodiment, the one or more machine learning models include one or more trained neural networks. For example, a first trained neural network is used for time-series data whilst a second neural network is used for image-based data. An example neural network for time-series data is shown in FIG. 4.

Figure 4:
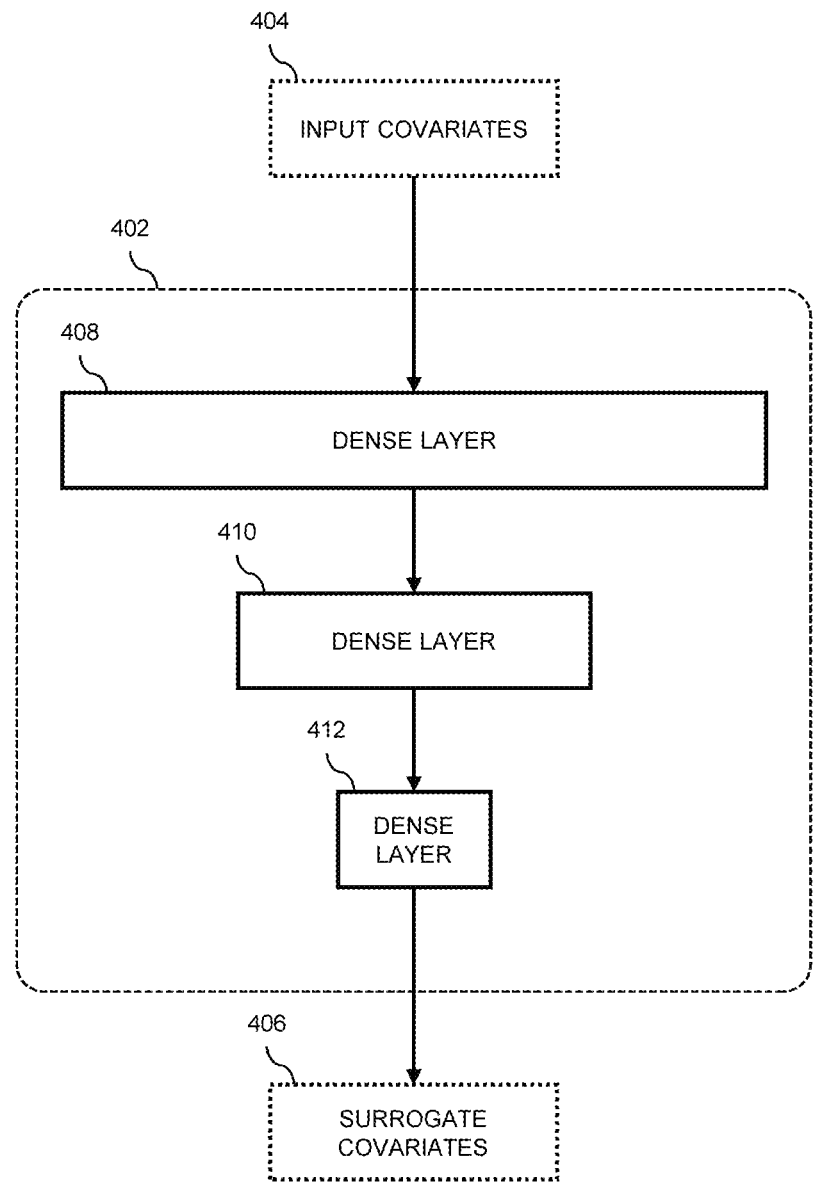
FIG. 4 shows a neural network architecture for mapping a plurality of covariates of the same data type to one or more surrogate covariates.

FIG. 4 shows a neural network architecture for mapping a plurality of covariates of the same data type to one or more surrogate covariates according to an embodiment of the present disclosure.

FIG. 4 shows a neural network 402 which receives input covariates 404 as input and outputs surrogate covariates 406. The neural network 402 comprises a first dense layer 408, a second dense layer 410, and a third dense layer 412.

In the example shown in FIG. 4, the input covariates 404 correspond to a vector of real values or integer values. The first dense layer 408 is a densely connected layer having, for example, 128 units. Each dimension of the input covariates 404 is connected to each unit of the first dense layer 408. Preferably, the first dense layer 408 utilises a swish activation function. Alternatively, other activation functions are used such as ReLU, hyperbolic tangent (tanh), or sigmoid. The second dense layer 410 is a densely connected layer having, for example, 64 units. Preferably, the second dense layer 410 comprises fewer units than the first dense layer 408 and more preferably comprises half as many units (or fewer) than the first dense layer 408. Preferably, the second dense layer 410 utilises a swish activation function. Alternatively, other activation functions are used such as ReLU, tanh, or sigmoid. The third dense layer 412 is a densely connected layer having a number of units equal to the target dimensionality of the surrogate covariates 406. The number of units in the third dense layer 412 is less than 64 and more preferably is less than 32. Yet more preferably, the number of units in the third dense layer 412 is less than 16 and more preferably again, the number of units in the third dense layer 412 is less than 10. Most preferably the number of units in the third dense layer 412 is equal to either one or three. The third dense layer 412 has a linear activation function.

As stated above, one or more machine learning models are used to map covariates of different data types to a single combined surrogate covariate. In such examples, multiple neural networks are combined into a single architecture. For example, a first neural network for time-series data is combined with a second neural network for image-based data to form a single monolithic model. In a further example, a first neural network for textual data is combined with a second neural network for vector-valued data.

Beneficially, this combined architecture is trained using a single training process and provides an efficient mechanism for mapping covariates of different data types to a combined compressed representation. This is shown in the example machine learning model of FIGS. 5A and 5B.

Figure 5A:
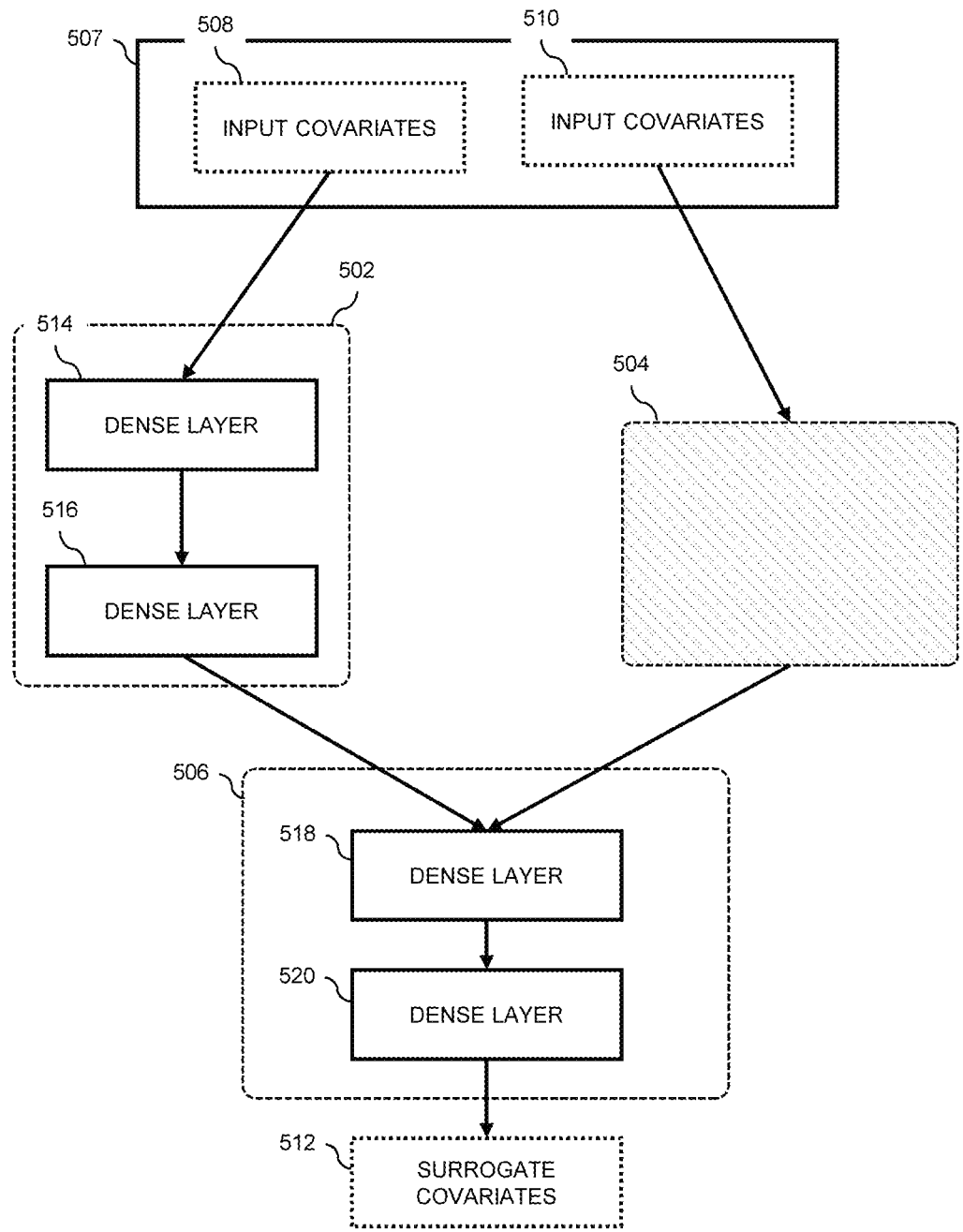
FIGS. 5A and 5B show a neural network architecture for mapping a plurality of covariates of two different data types to one or more surrogate covariates.

FIG. 5A shows a neural network architecture for mapping a plurality of covariates of two different data types to one or more surrogate covariates. Specifically, the neural network architecture shown in FIG. 5A is for mapping a vector-valued covariates and image-based covariates to one or more surrogate covariates.

The neural network architecture in FIG. 5A comprises a first neural network 502, a second neural network 504, and a third neural network 506. Whilst the three neural networks are illustrated as separate networks, they form a part of the same neural network architecture and are trained (and operate) as a single neural network. A plurality of covariates 507 comprises first input covariates 508 and second input covariates 510.

The first input covariates 508 are vector-valued and the second input covariates 510 are image-based. The first neural network 502 receives first input covariates 508 as input, the second neural network 504 receives second input covariates 510 as input, and the third neural network 506 receives as input the outputs of both the first neural network 502 and the second neural network 504. The third neural network 506 outputs one or more surrogate covariates 512. The first neural network 502 comprises a first dense layer 514 and a second dense layer 516. The architecture of the second neural network 504 is described in more detail in relation to FIG. 5B below. The third neural network 506 comprises a first dense layer 518 and a second dense layer 520.

The first neural network 502 receives vector-valued input covariates and is similar to the neural network 402 shown in FIG. 4. Specifically, the first dense layer 514 corresponds to the first dense layer 408 of the neural network 402 and the second dense layer 516 corresponds to the second dense layer 410 of the neural network 402.

Figure 5B:
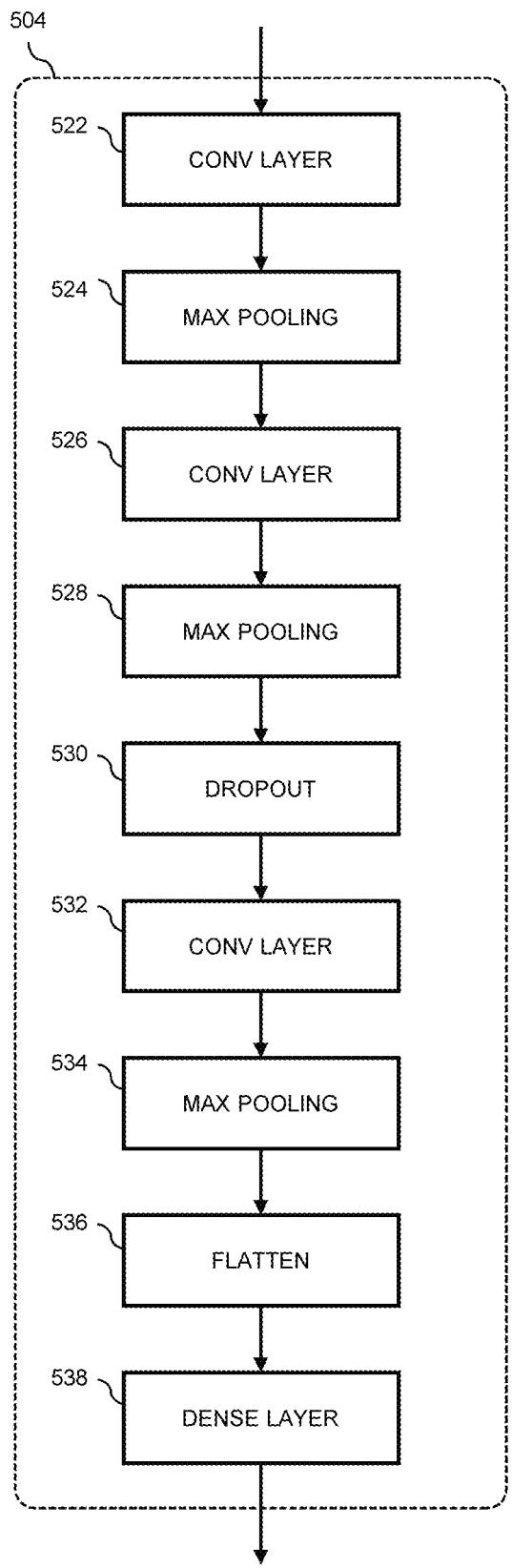

The second neural network 504 receives image-based input covariates and is described in detail in relation to FIG. 5B.

FIG. 5B shows the architecture of the second neural network 504 of FIG. 5A.

The second neural network 504 comprises a first convolutional layer 522, a first max pooling layer 524, a second convolutional layer 526, a second max pooling layer 528, a dropout layer 530, a third convolutional layer 532, a third max pooling layer 534, a flattening layer 536, and a dense layer 538.

The second neural network 504 receives image-based data. Particularly, the second neural network 504 receives three-channel image-based data such as RGB images or HSV images. Image-based data of width W and height H may be represented as a tensor of the form 1×W×H×3.

The first convolutional layer 522 is a 3-dimensional convolutional layer having, for example, 64 output filters and a kernel size of (1, 3, 3) such that the 3D convolution window has a depth of 1, a height of 3, and a width of 3. The first convolutional layer 522 has a ReLU activation function. Alternatively, a swish, tanh, or sigmoid activation function may be used. The first max pooling layer 524 is a 3-dimensional max pooling layer having a pool size of (1, 2, 2) such that the second and third dimensions of the input to the first max pooling layer 524 are halved in size. Alternatively, other pool sizes may be used such that the second and third dimensions are reduced by a third, a quarter, a fifth, etc. The first max pooling layer 524 has a swish activation function. Alternatively, a ReLU, tanh, or sigmoid activation function may be used. The second convolutional layer 526 is a 3-dimensional convolutional layer having 32 output filters, a kernel size of (1, 3, 3), and a ReLU activation function. The second max pooling layer 528 is a 3-dimensional max pooling layer having a pool size of (1, 2, 2) and a swish activation function. The dropout layer 530 has a dropout rate of 0.25 such that 25% of the input units are dropped. The third convolutional layer 532 is a 3-dimensional convolutional layer having 16 output filters, a kernel size of (1, 3, 3), and a ReLU activation function. The third max pooling layer 534 is a 3-dimensional max pooling layer having a pool size of (1, 2, 2) and a swish activation function. The flattening layer 536 flattens the input to a 64-dimensional output shape. The dense layer 538 comprises 64 densely connected units and has a swish activation function. Alternatively, the dense layer 536 comprises any other number of densely connected units such as 32, 16, or 8 units.

The skilled person will appreciate that modifications can be made to the above described architecture. For example, alternative activation functions may be employed such as replacing the ReLU activation function of the first convolutional layer 522. In addition, other pool sizes may be used such that the dimensions are reduced by a third, a quarter, a fifth, etc. Moreover, the dropout rate of the dropout layer 530 may be any other suitable value such as 0.75, 0.5, 0.3, 0.2, 0.1 or the like.

The output of the dense layer 538 of the second neural network 504, along with the output of the second dense layer 516 of the first neural network 502, is input to the first dense layer 518 of the third neural network 506 as shown in FIG. 5A.

Referring once again to FIG. 5A, the first dense layer 518 of the third neural network 506 is a densely connected layer having, for example, 128 units. Preferably, the first dense layer 518 utilises a swish activation function. Alternatively, other activation functions are used such as ReLU, tanh, or sigmoid. The second dense layer 520 is a densely connected layer having a number of units equal to the target dimensionality of the one or more surrogate covariates 512. The number of units in the second dense layer 520 is less than 64 and more preferably is less than 32. Yet more preferably, the number of units in the second dense layer 520 is less than 16 and more preferably again, the number of units in the second dense layer 520 is less than 10. Most preferably the number of units in the second dense layer 520 is equal to one or three. The second dense layer 520 has a linear activation function.

Prior to use as part of the first forecasting step, the above neural network architectures are trained. Both the neural network architecture shown in FIG. 4 and the neural network architecture shown in FIGS. 5A and 5B are trained using an Adam optimiser with a root mean squared error (RMSE) loss function. The weights within each neural network architecture are initialised using a Glorot Normal initialisation with all biases set to zero. In one example implementation, the Adam optimiser is initialised with parameters $\beta_1=0.9$, $\beta_2=0.999$, AND $\epsilon=10^{-7}$ AND A LEARNING RATE OF $10^{-5}$ IS USED. A BATCH SIZE OF 64 with an epoch size of 1500 is used.

The neural network architectures are trained such that the one or more surrogate covariates are closely correlated with the plurality of covariates. In one example implementation, a training data set is used comprising a plurality of signals of interest, a plurality of covariates, and a corresponding plurality of parameters of the predetermined distribution of the statistical model of extremes. The neural network architectures are then trained using the above methodology on this training data such that the one or more surrogate covariates are closely correlated with the plurality of covariates (i.e., the RMSE between the plurality of parameters in the training data and the plurality of parameters produced using the surrogate covariates is minimised).

Each machine learning model handles a different data type. For example, the neural network architecture shown in FIGS. 5A and 5B map vector-valued and image-based covariates to surrogate covariates. To route covariates of the plurality of covariates to the relevant machine learning model (or neural network head), a set of automated rules are employed. For example, a first rule routes the first input covariates 508 to the first neural network 502 and a second rule routes the second input covariates 510 to the second neural network 504. In one implementation, the rules examine the filename extension of the incoming covariates to determine which machine learning model can process the covariates. Alternatively, metadata accompanying the covariates is used to determine which machine learning model to use.

Step 308: Mapping the Plurality of Covariates to One or More Surrogate Covariates Referring once again to FIG. 3, the method 300 further comprises, as part of the first forecast, mapping 308, using the one or more trained machine learning models and the input data, the plurality of covariates to one or more surrogate covariates. The one or more surrogate covariates corresponding to a compressed representation of the input data.

The one or more machine learning models, as described above, are used to produce a compressed representation of the input data in the form of one or more surrogate covariates. This allows data from a variety of different sources to be used for model fitting (as described below). The modular approach of the present disclosure, whereby each data type in the plurality of covariates is handled by a separate machine learning model, allows a rich variety of different data types to be used and aggregated to produce one or more covariates.

In some embodiments, the one or more machine learning models form a part of a single architecture (e.g., the neural network architecture shown in FIGS. 5A and 5B) such that the one or more surrogate covariates are directly obtained from the output of the one or more machine learning models. In other embodiments, the outputs of the one or more machine learning models are concatenated or otherwise combined to form the one or more surrogate covariates.

Step 310: Fitting a Statistical Model of Extremes

The method 300 further comprises, as part of the first forecast, fitting 310 a statistical model of extremes to the plurality of signals of interest and the one or more surrogate covariates thereby generating a fitted statistical model of extremes. The statistical model of extremes being defined according to a predetermined distribution having a plurality of parameters.

As described in more detail below, the step of fitting 310 may comprise obtaining a previously fitted statistical model of extremes and updating the plurality of parameters of the predetermined distribution according to the plurality of signals of interest and the one or more surrogate covariates.

In the present disclosure, fitting a statistical model of extremes involves using either a block maxima approach or a peaks-over-threshold (POT) approach. The skilled person will appreciate that the present disclosure is not limited to these approaches, and any suitable model of extremes may be used. The choice of statistical model of extremes and predetermined distribution depends on factors such as the stationarity of the data and whether the data is univariate or multivariate. In one embodiment, the statistical model of extremes is fitted using a block maxima approach as illustrated in FIG. 6.

Figure 6:
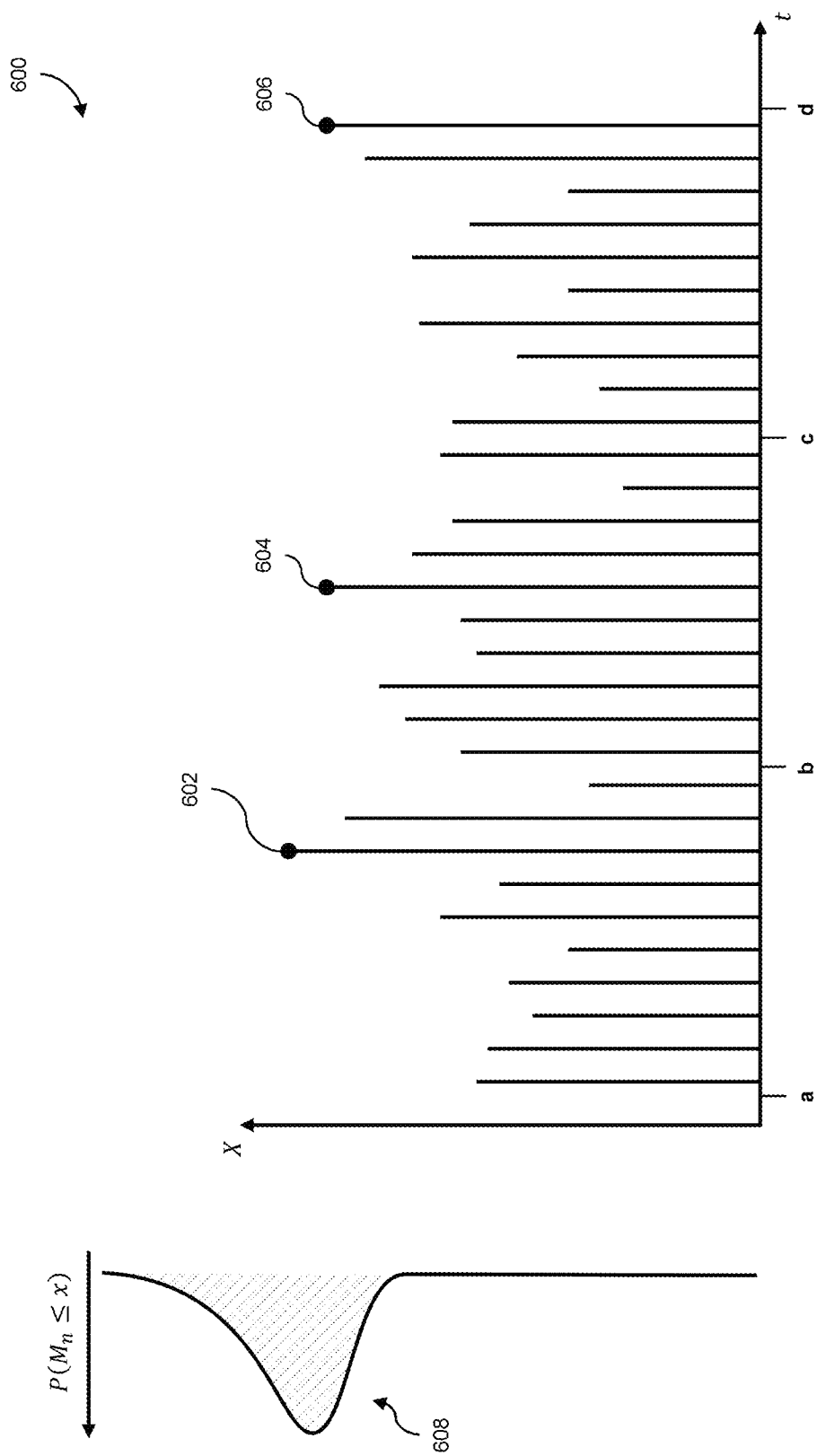
FIG. 6 illustrates the block maxima approach to modelling extreme values.

FIG. 6 shows a plot 600 illustrating the block maxima approach to modelling extreme values.

Figure 1A:
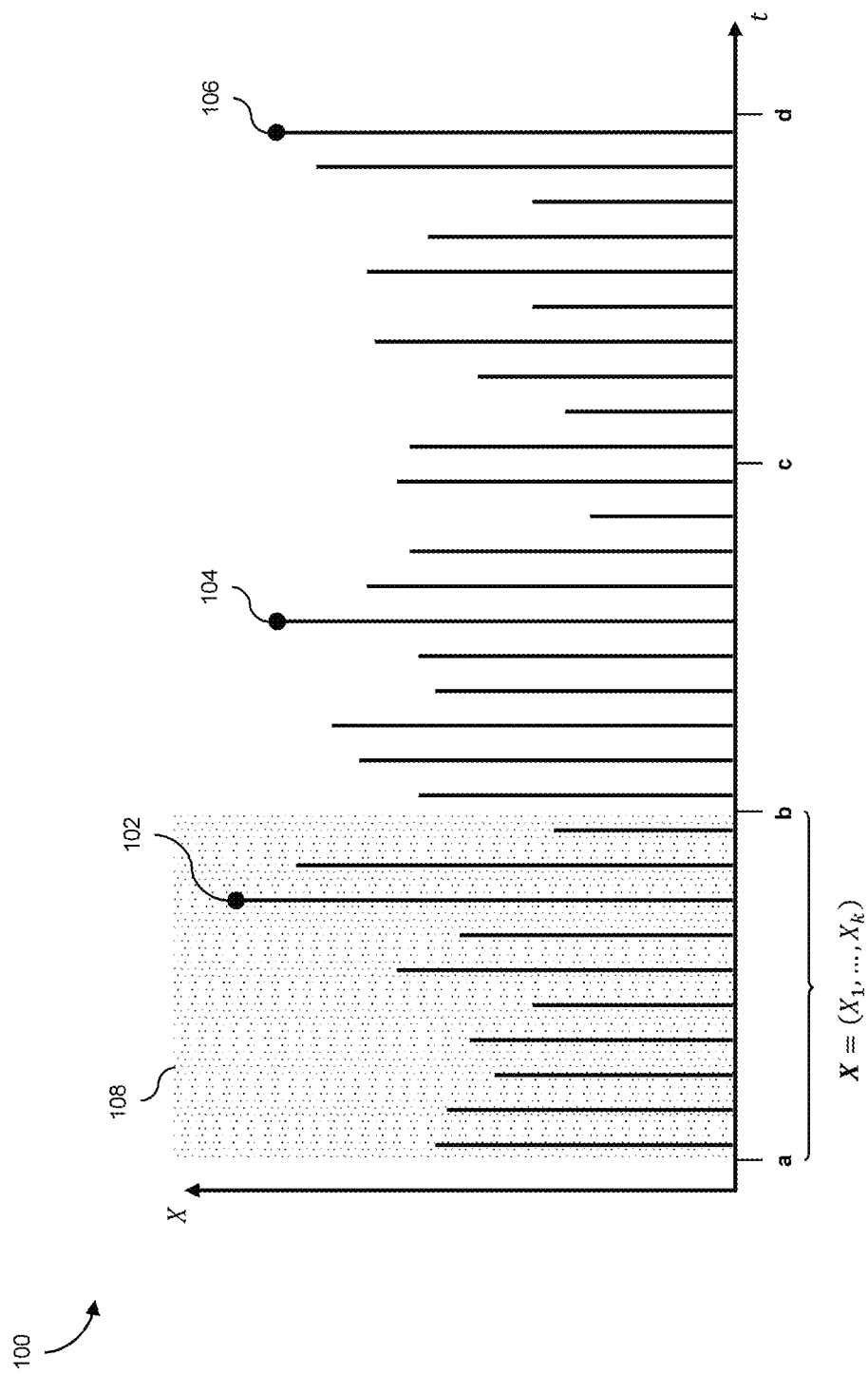
FIGS. 1A and 1B illustrate two approaches for estimating extreme values within time-series data.
Figure 1B:
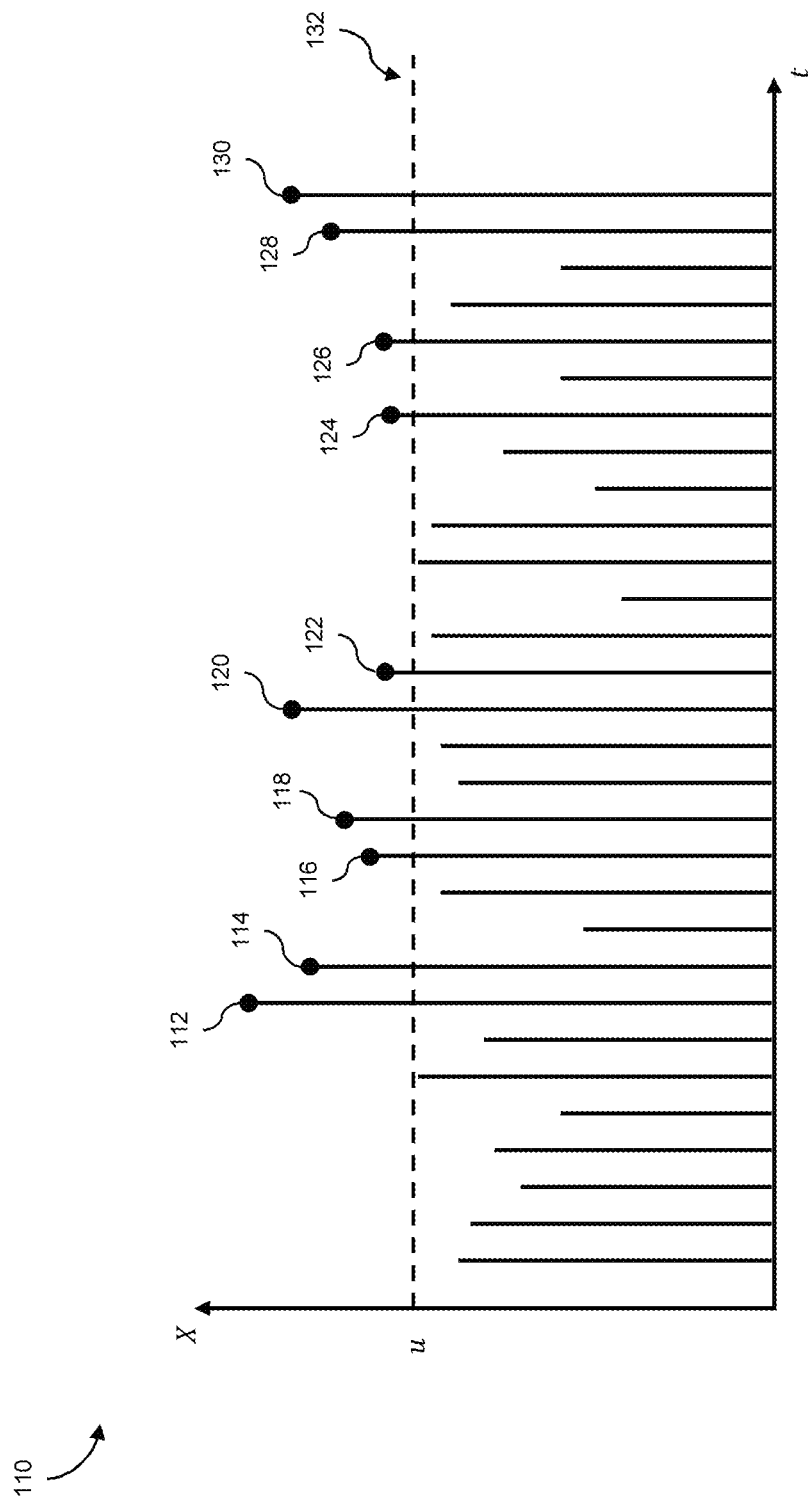

The plot 600 corresponds in part to the first time-series plot 100 shown in FIG. 1 and comprises a plurality of extreme values 602, 604, 606 determined for blocks a-b, b-c, and c-d respectively. FIG. 6 further shows a predetermined distribution 608.

As previously stated, the block maxima approach divides the data into several, sufficiently large, blocks and selects the maximum value within each block. The distribution of the extreme values is then determined by fitting a suitable distribution, such as the generalised extreme value (GEV) distribution, to the extreme values. This is illustrated in FIG. 6 by the predetermined distribution 608 which corresponds to a GEV distribution fitted to the plurality of extreme values 602, 604, 606.

Various techniques may be used to determine the number of blocks and the size of blocks. In general, if there are N data points, then data is split into $n=\sqrt{N}$ blocks of size $k=\sqrt{N}$ each. However, in many applications, the blocks may be predetermined by the application domain or the standards of data recording. For example, yearly or quarterly maxima in environmental applications, and daily or hourly maxima in the health monitoring context. As such, in some implementations, the block size and the number of blocks are predetermined according to contextual information related to the problem domain.

For the block maxima approach, the step of fitting 310 a statistical model of extremes comprises first determining the extreme values for each block, and second fitting a GEV distribution to the observed extreme values (i.e., the extreme values determined in the first step).

When the plurality of signals of interest are univariate and stationary (i.e., the plurality of signals of interest, $X=(X(t))$, corresponds to a sequence of independent and identically distributed random variables) the predetermined distribution corresponds to the GEV distribution, $$P(M \leq x) \approx G(x) = \exp\left\{-\left(1 + \frac{\xi(x-\mu)}{\sigma}\right)_+^{-1/\xi}\right\} \quad (x \in \mathbb{R}), \quad (1)$$

where $M=\max\{X(t_1), \ldots, X(t_k)\}$ is the maximum value in a block of size k, $\alpha_+=\max(\alpha, 0)$, and $\sigma>0$, $\xi$ and $\mu$, are the scale, shape, and location parameters of the GEV distribution, respectively. The borderline value $\xi=0$ is included in Eq. (1) by means of the limit $\xi \to 0$, leading to the Gumbel (double exponential) distribution $$P(M \leq x) \approx G(x) = \exp\left\{-\exp\left(-\frac{x-\mu}{\sigma}\right)\right\} \quad (x \in \mathbb{R}). \quad (2)$$

The plurality of parameters of the predetermined distribution of Eq. (1) are represented as $\theta=(\sigma,\xi,\mu)$. Fitting the predetermined distribution of Eq. (1) comprises determining values for the plurality of parameters which best model the observed extreme values $M=(M_1, \ldots, M_n)$ in n blocks. The fitted statistical model of extremes is thus generated by determining the plurality of parameters for the predetermined distribution.

In an embodiment, the values for the plurality of parameters of the predetermined distribution of Eq. 1 are determined using the maximum likelihood (ML) estimation method. The likelihood of the GEV model is built as the product of the GEV densities (obtained by taking the derivative of the distribution function of Eq. (1)) across the extremal data, $$L(\theta|M) = \prod_{i=1}^{n} \frac{1}{\sigma}\left(1 + \xi\frac{M_i - \mu}{\sigma}\right)_+^{-1/\xi - 1} \exp\left\{-\left(1 + \frac{\xi(M_i - \mu)}{\sigma}\right)_+^{-1/\xi}\right\}. \quad (3)$$

The ML estimation method comprises a numerical maximisation of the function $L(\theta|M)$ with respect to the vector parameter $\theta=(\sigma,\xi,\mu)$, and the respective maximiser $\hat{\theta}=(\hat{\sigma},\hat{\xi},\hat{\mu})$ is the resulting maximum likelihood estimate. As such, the maximum likelihood estimate, $\hat{\theta}=(\hat{\sigma},\hat{\xi},\hat{\mu})$, corresponds to the plurality of parameters of the predetermined distribution of Eq. (1) according to the ML estimation method. The numerical maximisation of the likelihood function $L(\theta|M)$ is performed using an iterative method such as gradient descent, the Newton-Raphson method, or any quasi-Newton method.

In an alternative embodiment, the plurality of parameters of the predetermined distribution of Eq. (1) are determined using a Markov chain Monte Carlo (MCMC) sampling technique. This method is based on pursuing the Bayesian approach to parameter estimation by treating parameters as random variables rather than unknown constants. Starting with a certain prior distribution density $q(\theta)$ (which incorporates available information, or beliefs, about the parameter $\theta$), the aim of statistical estimation is to update the prior distribution density through the data and to obtain the posterior distribution density $q(\theta|M)$, which is proportional to $L(\theta|M)q(\theta)$ (Bayes' formula). Thus, the likelihood acts as an updating tool to improve knowledge about the parameter distribution. In the present embodiment, the prior $q(\theta)$ is chosen as a multivariate normal distribution centred at a pilot estimate of the parameter $\theta$ (e.g., based on past experience in the application domain) and standard deviation set initially as a large positive number (to emulate an almost flat "uninformative" prior) but afterwards tuned dynamically to ensure convergence to equilibrium.

Under a suitable MCMC algorithm, such as the Metropolis-Hastings sampler, the posterior density $q(\theta|M)$ is obtained as the equilibrium distribution density $\pi(\theta)$ of a Markov chain $(\theta_k)$ where the next state $\theta_{k+1}$ depends only on the present state $\theta_k$. The Markov chain is implemented using a generalised acceptance-rejection sampling method. Namely, given the current state $\theta$ of the chain, a new candidate state θ' is generated according to a proposal density π(θ'|θ), which is accepted with probability $$A(\theta'|M) = \min\left\{1, \frac{q(\theta'|M)\pi(\theta|\theta')}{q(\theta|M)\pi(\theta'|\theta)}\right\}. \quad (4)$$

In the present disclosure, the proposals are sampled from a normal distribution centred at the current state θ of the Markov chain, with standard deviation set initially as a small positive number (to ensure a more careful exploration of the distribution landscape) but afterwards tuned dynamically to keep the acceptance rate within a predetermined range from 35% to 75%. Since such a proposal density is symmetric, π(θ'|θ)=π(θ|θ'), the acceptance probability of Eq. (4) is reduced to $$A(\theta'|M) = \min\left\{1, \frac{L(\theta'|M)q(\theta')}{L(\theta|M)q(\theta)}\right\}. \quad (5)$$

The above acceptance-rejection sampling method is repeated until an equilibrium is reached. As the skilled person will appreciate, the equilibrium is monitored by standard diagnostic tools that may be implemented in an unsupervised manner. For example, the Gelman-Rubin diagnostic based on comparing parallel Markov chains.

After the equilibrium has been reached, continued performance of the MCMC algorithm produces (random) sample values of the parameter θ under the target posterior distribution q(θ|M). The plurality of parameters of the predetermined distribution of Eq. (1) of the fitted statistical model of extremes are thus obtained from the posterior mean (also called the Bayesian estimate) or the posterior median, both of which are determined empirically on the basis of the posterior sample.

When the plurality of signals of interest are univariate but non-stationary, the block maxima framework is implemented by treating the plurality of parameters of the predetermined distribution as functions of recorded covariates per block, C=($c_i$). Due to the block nature of the method, such a dependence can only be modelled through aggregated covariates. For example, average yearly temperature, mean daily glucose level, etc. Thus, to retain informational flexibility of the covariate counterpart of the data, the block size for the block maxima approach should be sufficiently small to imbed high-frequency measurements of covariates (e.g., hourly slots in per-minute measurements of air pollution concentrations). Moreover, the covariates are aggregated prior to generating the one or more surrogate covariates as described above in relation to the step of mapping 308.

Throughout the following, reference is made in general to covariates, or more specifically to the one or more covariates. The skilled person will appreciate that these references may also refer to surrogate covariates, or the one or more surrogate covariates. That is, in embodiments where machine learning models are used to generate one or more surrogate covariates, the references below to covariates refer equally to surrogate covariates.

For the plurality of signals of interest, X=(X(t)), and the one or more covariates per block, ($C_i$), the predetermined distribution of the block maximum M is a GEV-type approximation, $$P(M \leq x|C=c) \approx \exp\left\{-\left(1 + \frac{\xi(c)(x-\mu(c))}{\sigma(c)}\right)_+^{-1/\xi(c)}\right\} \quad (x \in \mathbb{R}). \quad (6)$$

The plurality of parameters of the predetermined distribution are then determined by estimating the latent functional dependency of the plurality of parameters upon the one or more covariates. As such, the step of fitting 310 the statistical model of extremes may further comprise the step of determining the plurality of parameters by estimating the latent functional dependency of the plurality of parameters upon the one or more covariates.

The latent functional dependency of the plurality of parameters upon the one or more covariates is estimated using one or more machine learning models. The one or more machine learning models correspond to a regression model comprising a plurality of regression parameters, wherein the one or more covariates correspond to explanatory variables of the regression model and the plurality of parameters correspond to dependent variables of the regression model.

That is, the dependence of ξ, σ, and μ, on the covariate vector c=($c_j$) is estimated using a regression-type specification of the form $$\log\sigma(c) = s_0 + \sum_j s_j c_j, \ \xi(c) = k_0 + \sum_j k_j c_j, \ \mu(c) = m_0 + \sum_j m_j c_j, \quad (7)$$

In an embodiment, the values for the plurality of parameters of the predetermined distribution of Eq. (6) are determined using the maximum likelihood (ML) estimation method. Through the regression parameterisation of Eq. (7), the likelihood of the model of Eq. (3) becomes a function of the regression coefficients, s=($s_j$), k=($k_j$), m=($m_j$), $$L(s, k, m|M) = \prod_{i=1}^{n} \frac{1}{\sigma(c_i)} \quad (8)$$
$$\left(1 + \xi(c_i)\frac{M_i - \mu(c_i)}{\sigma(c_i)}\right)_+^{-1/\xi(c_i)-1} \exp\left\{-\left(1 + \frac{\xi(c_i)(M_i - \mu(c_i))}{\sigma(c_i)}\right)_+^{-1/\xi(c_i)}\right\}.$$

The ML estimation method then proceeds with a numerical maximisation of the expression in Eq. (8), following a similar approach as described above in relation to Eq. (3), resulting in the ML estimates ($\hat{s}_j$), ($\hat{k}_j$), and ($\hat{m}_j$). The plurality of parameters of the predetermined distribution of Eq. (6) of the fitted statistical model of extremes according to the ML estimation method is $\hat{\theta}(c)$=(log $\hat{\sigma}(c), \hat{\xi}(c), \hat{\mu}(c)$), where $$\log\hat{\sigma}(c) = \hat{s}_0 + \sum_j \hat{s}_j c_j, \ \hat{\xi}(c) = \hat{k}_0 + \sum_j \hat{k}_j c_j, \text{ and } \hat{\mu}(c) = \hat{m}_0 + \sum_j \hat{m}_j c_j.$$

In an alternative embodiment, the values for the plurality of parameters of the predetermined distribution of Eq. (6) are determined using a Markov chain Monte Carlo (MCMC) sampling technique. Specifically, the joint posterior density of the plurality of regression parameters is estimated using an MCMC estimator. The MCMC estimator obtains the joint posterior density of the plurality of regression parameters by combining a joint prior density of the plurality of regression parameters with the likelihood of the plurality of regression parameters based on the plurality of observed signals of interest and the one or more surrogate covariates. To estimate the values of the plurality of parameters of the predetermined distribution of Eq. (6), the acceptable-rejection sampling method as described above is used (i.e., with acceptance probability of the form in Eq. (5))

In some embodiments, the forecasting performed in the method 300 of FIG. 3 at the step of performing 304 a forecast is repeated over several iterations such that, after a first forecast has been performed, further input data is obtained, and a second forecast is performed on the further input data. In such examples, the joint posterior density of the plurality of parameters estimated during one iteration is used as the joint prior density of the plurality of parameters in a subsequent iteration. That is, when transitioning from a first forecast to a second forecast, the joint prior density of the plurality of parameters used during the second forecast corresponds to the joint posterior density of the plurality of parameters estimated during the first forecast.

If the signal of interest is multivariate, $X(t)=(X_1(t), \ldots, X_p(t))$, then the block maxima approach to the extreme value modelling, similarly to the univariate case, comprises dividing the data into several, sufficiently large, blocks and determining the multivariate maximum within each block, which is defined as a vector of component-wise maxima, $$M = \max\{X(t_1), \ldots, X(t_k)\} = \left(\max_{t_1 \leq t \leq t_k}\{X_1(t)\}, \ldots, \max_{t_1 \leq t \leq t_k}\{X_p(t)\}\right). \quad (9)$$

The distribution of the extreme value vectors is then determined by fitting a suitable distribution, such as the multivariate generalised extreme value (MGEV) distribution, to the observed multivariate block maxima.

When the plurality of signals of interest are stationary (i.e., the plurality of signals of interest, $(X(t))$, corresponds to a sequence of independent and identically distributed random vectors), the predetermined distribution of the maximum vector in a block of large size k, $M=\max\{X(t_1), \ldots, X(t_k)\}$, corresponds to the MGEV distribution, $$P(M \leq x) \approx G(x) = \exp\left\{-m_*\left(\left(1 + \frac{\xi(x-\mu)}{\sigma}\right)_+^{-1/\xi}\right)\right\}, \quad (10)$$

$$x = (x_1, \ldots, x_p) \in \mathbb{R}^p,$$

where $\alpha_+=\max(\alpha, 0)$; $\sigma=(\sigma_1, \ldots, \sigma_p)>0$, $\xi=(\xi_1, \ldots, \xi_p)$ and $\mu=(\mu_1, \ldots, \mu_p)$ are the vectors of scale, shape, and location parameters of the MGEV distribution, respectively; and $m_*(x)$ is a suitable dependence function such as a logistic model of the form $$m_*(x) = \left(\sum_{i=1}^{p} w_i x_i^{-1/\kappa}\right)^\kappa, x = (x_1, \ldots, x_p) \geq 0, \quad (11)$$

with weights $w_i>0$ and logistic index $0<\kappa\leq 1$. Like in the univariate case (see Eq. (2)), the values $\xi_i=0$ are included in Eq. (10) via the limit $\xi_i \to 0$, so that the expressions $$\left(1 + \frac{\xi_i(x_i-\mu_i)}{\sigma_i}\right)_+^{-1/\xi_i}$$

are replaced by $$\exp\left(-\frac{x_i-\mu_i}{\sigma_i}\right).$$

The plurality of parameters of the predetermined distribution of Eq. (10) are represented as $\theta=(\sigma,\xi,\mu, w, \kappa)$, where $\sigma=(\sigma_i)$, $\xi=(\xi_i)$, $\mu=(\mu_i)$ are the scale, shape, and location parameters, respectively, $w=(w_i)$ are the logistic weights, and $\kappa$ is the logistic index (see Eq. (11)). Fitting the predetermined distribution of Eq. (10) comprises determining values for the plurality of parameters which best model the observed multivariate extreme values $M_1, \ldots, M_n$ in n blocks. The fitted statistical model of extremes is thus generated by determining the plurality of parameters for the predetermined distribution.

In an embodiment, the values for the plurality of parameters of the predetermined distribution of Eq. (10) are determined using the maximum likelihood (ML) estimation method. The likelihood of the MGEV model is given as the product across the extremal data of the MGEV densities obtained as the p-th order partial derivative of the distribution function of Eq. (10), $$L(\theta \mid M_1, \ldots, M_n) = \prod_{i=1}^{n} f(M_i \mid \theta), f(x \mid \theta) = \frac{\partial^p G(x_1, \ldots, x_p)}{\partial x_1 \ldots \partial x_p}. \quad (12)$$

The ML estimation method comprises a numerical maximisation of the likelihood function $L(\theta|(M_i))$ specified in Eq. (12) with respect to the vector parameter $\theta=(\sigma,\xi,\mu, w,\kappa)$. The respective maximiser $\hat{\theta}=(\hat{\sigma},\hat{\xi},\hat{\mu},\hat{w},\hat{\kappa})$ is the resulting maximum likelihood estimate. As such, the maximum likelihood estimate, $\hat{\theta}=(\hat{\sigma},\hat{\xi},\hat{\mu},\hat{w},\hat{\kappa})$ corresponds to the plurality of parameters of the predetermined distribution of Eq. (10) according to the ML estimation method. The numerical maximisation of the likelihood function $L(\theta|(M_i))$ is performed using an iterative method such as gradient descent, the Newton-Raphson method, or any quasi-Newton method.

In an alternative embodiment, the plurality of parameters of the predetermined distribution of Eq. (30) are determined using a Markov chain Monte Carlo (MCMC) sampling technique. Specifically, the joint posterior density of the plurality of parameters is estimated using an MCMC estimator. The MCMC estimator obtains the joint posterior density of the plurality of parameters by combining a joint prior density of the plurality of parameters with the likelihood of the plurality of parameters of Eq. (12) based on the plurality of observed block maxima $M_1, \ldots, M_n$. To estimate the values of the plurality of parameters of the predetermined distribution of Eq. (30), the acceptable-rejection sampling method as described above is used (i.e., with acceptance probability of the form in Eq. (5)).

In an alternative embodiment to the block maxima approach described above, the statistical model of extremes is fitted using a peaks-over-threshold (POT) approach. This is illustrated in FIG. 7.

Figure 7:
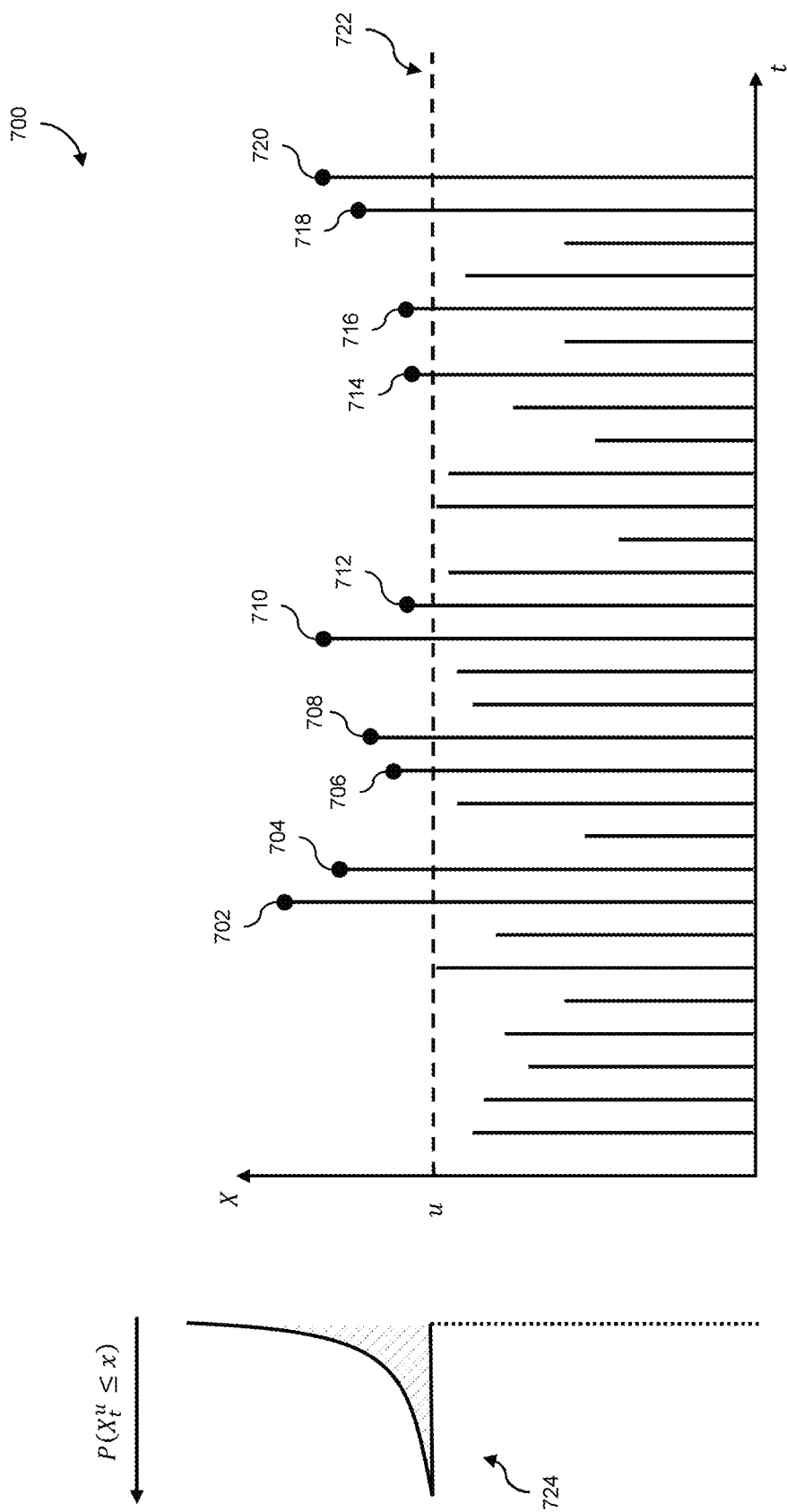
FIG. 7 illustrates the peaks-over-threshold approach to modelling extreme values.

FIG. 7 shows a plot 700 illustrating the peaks-over-threshold (POT) approach to modelling extreme values.

The plot 700 shows a plurality of extreme values 702-720 determined as exceedances above a threshold 722, u. As such, the plot 700 corresponds in part to the second time-series plot 110 shown in FIG. 1B and as explained above. FIG. 7 further shows a predetermined distribution 724.

As previously stated, the POT approach specifies a preferably large value for the threshold 722, u, such that only those signals of interest which exceed the threshold 722 are considered extreme values. The distribution of the extreme values is then determined by fitting a suitable distribution, such as the generalised Pareto distribution (GPD), to the extreme values. This is illustrated in FIG. 7 by the predetermined distribution 724 which corresponds to a GPD distribution fitted to the plurality of extreme values 702-720.

For the POT approach, the step of fitting 310 a statistical model of extremes comprises first determining the threshold, u, and second fitting a GPD distribution to the extreme values.

In general, the threshold, u, is determined based on a balance between the accuracy of statistical approximation via the Pareto model (demanding higher thresholds) and the quality of statistical estimation of the model parameters from available exceedances (which would get depleted due to higher thresholds). Preferably, the threshold is chosen according to an empirical quantile; for instance at a 95% level, so that about 5% of observed values lie above this threshold. This empirical approach is particularly useful for initial calibration of the model (e.g., at a piloting stage). In many cases, thresholds of interest are determined by the subject matter. For example, an outside air concentration of nitrogen dioxide ($NO_2$) above 200 µg/m³ (according to Euro 6 emission standards), or the glucose level above 140 mg/dL (for non-diabetic patients).

When the plurality of signals of interest are univariate and stationary (i.e., the plurality of signals of interest, X=(X(t)), corresponds to a sequence of independent and identically distributed random variables), the plurality of signals of interest are censored by defining the threshold exceedances over a threshold u, $$X_u(t) = X_t - u > 0 \quad (13)$$

which is conditional on $X_t > u$. Because the threshold u is assumed to be high (as described above) the threshold exceedance rate, $\rho_u$, is small, $$\rho_u = P(X_t > u) \approx 0 \quad (14)$$

The distribution of threshold exceedances, $X_u(t)$, is approximated by the generalised Pareto distribution (GPD) with two parameters: shape $\xi$ (usually assumed not to depend on the threshold, u) and scale $\sigma_u$, $$P(X_u(t) \le x) \approx H_u(x) = 1 - \left(1 + \frac{x\xi}{\sigma_u}\right)_+^{-1/\xi} \quad (x \ge 0). \quad (15)$$

Note that the expected value and the median of the predetermined distribution of Eq. (15) are given, respectively, by $$\mu_{GPD}^u = \frac{\sigma_u}{1-\xi} \quad (\xi < 1) \quad (16)$$

and by $$m_{GPD}^u = \frac{\sigma_u(2^\xi - 1)}{\xi}. \quad (17)$$

The predetermined distribution of Eq. (15) for stationary data is known to be threshold stable: if the threshold u is replaced by u+v (with v≪u) then the shape parameter remains unchanged, while the scale parameter σ and the exceedance rate ρ are recalculated efficiently using the algebraic formulas $$\sigma_{u+v} = \sigma_u + v, \; \rho_{u+v} = \rho_u \left(1 + \frac{v}{\sigma_u}\right)_+^{-1/\xi} \quad (18)$$

The use of such algebraic formulas beneficially allows the threshold to change across iterations (i.e., across subsequent forecasts) without requiring the statistical model of extremes to be fitted from scratch.

The plurality of parameters of the predetermined distribution of Eq. (15) are represented by the vector $\theta = \theta_u = (\xi, \sigma_u, \rho_u)$. In an embodiment, the values for the plurality of parameters of the predetermined distribution of Eq. (15) are determined using the maximum likelihood (ML) estimation method. Given the plurality of observations of interest, $X=(X(t_i), i=1, \ldots, n)$, the censored likelihood of the predetermined distribution of Eq. (15) is expressed by $$L(\theta \mid X) = \prod_{i=1}^{n} (1 - \rho_u)^{1-\delta_u(X(t_i))} \left(\frac{\rho_u}{\sigma_u}\left(1 + \xi\frac{X(t_i) - u}{\sigma_u}\right)_+^{-1/\xi}\right)^{\delta_u(X(t_i))} \quad (19)$$

where $\delta_u(x)$ is the threshold exceedance indicator such that $\delta_u(x)=1$ if x>u and $\delta_u(x)=0$ otherwise. The plurality of parameters of the predetermined distribution are estimated using the ML estimation method comprising a numerical maximisation of the likelihood of Eq. (19) over the domain of parameter θ. As described above, the ML estimation method proceeds with a numerical maximisation of the expression in Eq. (19) resulting in ML estimates $\hat{\xi}$, $\hat{\sigma}_u$, and $\hat{\rho}_u$. Accordingly, the plurality of parameters of the predetermined distribution of Eq. (15) of the fitted statistical model of extremes according to the above ML method are $\hat{\theta}_u = (\hat{\xi}, \hat{\sigma}_u, \hat{\tau}_u)$.

In an alternative embodiment, the plurality of parameters of the predetermined distribution of Eq. (15) are determined using a Markov chain Monte Carlo (MCMC) sampling technique. Specifically, the joint posterior density of the plurality of parameters is estimated using an MCMC estimator. The MCMC estimator obtains the joint posterior density of the plurality of parameters by combining a joint prior density of the plurality of parameters with the likelihood of the plurality of parameters (Eq. (19)) based on the plurality of observed signals of interest and the one or more surrogate covariates. To estimate the values of the plurality of parameters of the predetermined distribution of Eq. (15), the acceptable-rejection sampling method as described above is used.

In some embodiments, the forecasting performed in the method 300 of FIG. 3 at the step of performing 304 a forecast is repeated over several iterations such that, after a first forecast has been performed, further input data is obtained, and a second forecast is performed on the further input data. In such examples, the joint posterior density of the plurality of parameters estimated during one iteration is used as the joint prior density of the plurality of parameters in a subsequent iteration. That is, when transitioning from a first forecast to a second forecast, the joint prior density of the plurality of parameters used during the second forecast corresponds to the joint posterior density of the plurality of parameters estimated during the first forecast.

When the plurality of signals of interest are univariate but non-stationary, the non-stationarity of the plurality of signals of interest, (X(t)), is captured by treating the plurality of parameters, $\theta = (\xi, \sigma_u, \rho_u)$, as functions of the one or more (surrogate) covariates, C(t). This leads to the predetermined distribution, $$P(X_u(t) \le x \mid C(t) = c) \approx H_u(x \mid c) = 1 - \left(1 + \frac{x\xi(c)}{\sigma_u(c)}\right)_+^{-1/\xi(c)} \quad (x \ge 0). \quad (20)$$

The plurality of parameters of the predetermined distribution are then determined by estimating the latent functional dependency of the plurality of parameters upon the one or more surrogate covariates. As such, the step of fitting 310 the statistical model of extremes may further comprise the step of determining the plurality of parameters by estimating the latent functional dependency of the plurality of parameters upon the one or more surrogate covariates.

The latent functional dependency of the plurality of parameters upon the one or more surrogate covariates is estimated using one or more machine learning models. In one embodiment, the one or more machine learning models correspond to a regression model comprising a plurality of regression parameters, wherein the one or more surrogate covariates correspond to explanatory variables of the regression model and the plurality of parameters correspond to dependent variables of the regression model.

That is, the dependence of $\xi$ and $\sigma_u$ on the covariate vector $c=(c_j)$ is estimated using a regression-type specification of the form $$\xi(c) = k_u^0 + \sum_j k_u^j c_j, \log\sigma_u(c) = s_u^0 + \sum_j s_u^j c_j, \quad (21)$$

Similarly, the exceedance rate p u is parameterised using logistic regression, $$\text{logit } \rho_u(c) = r_u^0 + \sum_j r_u^j c_j, \quad (22)$$

where $$\text{logit } s = \log\frac{s}{1-s}, 0 < s < 1. \quad (23)$$

However, the above parameterisation in Eq. (21) and Eq. (22) assumes that the threshold u remains stable. That is, it does not change between subsequent iterations of the forecasting process performed at the step of performing 304 a forecast. If the threshold were to be replaced by u+v (where v≪u, i.e., the increment v is small as compared to the original threshold u), then the statistical model of extremes would need to be rebuilt and estimated from scratch to account for the new threshold. The lack of threshold stability for the parameterisation in Eq. (21) and Eq. (22) thus results in increased use of processing resources and time thereby limiting the applicability of the model for online processing.

To address this issue, the regression-type specification of Eq. (21) is replaced by $$\sigma_u(c)=\alpha(c)+(u-u_0)\beta(c)>0, \xi(c)=\gamma(c), \quad (24)$$

which guarantees that $\sigma_{u+v}(c)=\sigma_u(c)+v\xi(c)$. Here, $u_0$ is a preset calibration threshold and $\alpha(c)=\tau_{u_0}$. Accordingly, the logistic regression parameterisation in Eq. (22) is replaced by $$\log \rho_u(c) = \gamma(c) - \frac{1}{\beta(c)}\log\left(1 + \frac{(u-u_0)\beta(c)}{\alpha(c)}\right)_+ < 0, \quad (25)$$

where $\gamma(c)=\log \rho_{u_0}(c)$.

Any suitable calibration threshold $u_0$ in Eq. (24) and Eq. (25) may be used provided it is close to the required range of thresholds u (so that the difference $u-u_0$ is small as compared to u). In practice, the calibration threshold $u_0$ is selected for the sake of computational convenience, for example, as a 95% empirical quantile of the pooled data.

As an additional benefit, the threshold stability achieved by Eq. (24) and Eq. (25) also resolves the problem of entanglement of parameters. This problem occurs when a small change in one parameter leads to significant changes in other parameters. The resolution of this problem therefore allows a more efficient determination of the plurality of parameters to be made.

The predetermined distribution of Eq. (20) is fitted using a linear-regression parameterisation of the covariate-dependent coefficients, $\alpha(c)$, $\beta(c)$ and $\gamma(c)$ involved in Eq. (24) and Eq. (25), $$\alpha(c) = a_0 + \sum_j a_j c_j, \beta(c) = b_0 + \sum_j b_j c_j, \gamma(c) = g_0 + \sum_j g_j c_j. \quad (26)$$

In an embodiment, the values for the plurality of parameters of the predetermined distribution of Eq. (20), given the linear-regression parameterisation of Eq. (26), are determined using the maximum likelihood (ML) estimation method. Through the regression parameterisation of Eq. (26), the likelihood of the model of Eq. (3) becomes a function of the regression coefficients, $a=(a_j)$, $b=(b_j)$, $g=(g_j)$, $$L(a, b, g \mid X) = \prod_{i=1}^{n}(1 - \rho_u(c(t_i)))^{1-\delta_u(X(t_i))} \times \left(\frac{\rho_u(c(t_i))}{\sigma_u(c(t_i))}\left(1 + \xi(c(t_i))\frac{X(t_i)-u}{\sigma_u(c(t_i))}\right)_+^{-1-\frac{1}{\xi(c(t_i))}}\right)^{\delta_u(X(t_i))} \quad (27)$$

where c(t) is the covariate vector observed alongside the signal X(t). The ML estimation method then proceeds with a numerical maximisation of the expression in Eq. (27), following a similar approach as described above in relation to Eq. (3), resulting in the ML estimates $(\hat{a}_j)$, $(\hat{b}_j)$, and $(\hat{g}_j)$. The plurality of parameters of the predetermined distribution of Eq. (20) of the fitted statistical model of extremes according to the ML estimation method are $\hat{\theta}(c)=(\hat{\xi}(c), \hat{\sigma}_u(c), \hat{\rho}_u(c))$, where $$\hat{\sigma}(c) = \hat{a}_0 + \sum_j \hat{a}_j c_j + (u-u_0)\left(\hat{b}_0 + \sum_j \hat{b}_j c_j\right) > 0, \hat{\xi}(c) = \hat{b}_0 + \sum_j \hat{b}_j c_j \quad (28)$$

and $$\log\hat{\rho}_u(c) = \gamma(c) - \frac{1}{\hat{b}_0 + \sum_j \hat{b}_j c_j}\log\left(1 + \frac{(u-u_0)\left(\hat{b}_0 + \sum_j \hat{b}_j c_j\right)}{\hat{a}_0 + \sum_j \hat{a}_j c_j}\right)_+ < 0. \quad (29)$$

In an alternative embodiment, the values for the plurality of parameters of the predetermined distribution of Eq. (20) are determined using the Markov chain Monte Carlo (MCMC) sampling technique as described above. As such, a joint posterior density of the plurality of regression parameters is estimated using an MCMC, estimator. The MCMC estimator obtains the joint posterior density of the plurality of regression parameters by combining a joint prior density of the plurality of regression parameters with the likelihood of the plurality of regression parameters based on the plurality of observed signals of interest and the one or more surrogate covariates. Once the plurality of regression parameters have been determined, the regression-type specification of Eq. (24) is used to map the plurality of regression parameters to the plurality of parameters of the predetermined distribution.

As stated previously, in some embodiments, the forecasting performed in the method 300 of FIG. 3 at the step of performing 304 a forecast is repeated over several iterations such that, after a first forecast has been performed, further input data is obtained, and a second forecast is performed on the further input data. In such examples, the joint posterior density of the plurality of regression parameters estimated during one iteration is used as the joint prior density of the plurality of regression parameters in a subsequent iteration. That is, when transitioning from a first forecast to a second forecast, the joint prior density of the plurality of regression parameters used during the second forecast corresponds to the joint posterior density of the plurality of regression parameters estimated during the first forecast.

Referring once again to FIG. 7, the plot 700 illustrates the POT approach for the case whereby the plurality of signals of interest are univariate. This approach may be extended for multivariate signals of interest by replacing the predetermined distribution with a multivariate generalised Pareto distribution (MGPD).

As with the univariate case, the first step in fitting the statistical model of extremes is to determine the threshold, u. For the multivariate case, the threshold, u, is replaced with a threshold vector $u=(1, \ldots, u_p)$, which is used to define the p-dimensional exceedance vector as $X_u(t)=X(t)-u$ (conditional on $X(t) \not\leq u$). The MGPD is approximated as follows, $$P(X_u(t)\leq x) \approx H(x/\sigma_u), x=(x_1, \ldots, x_p) \not\leq 0, \quad (30)$$

where $\sigma_u$ is the scale parameter, being a vector-function of the multivariate threshold u. The MGPD function $H(x)$ (possibly depending on the threshold u) is given by $$H(x) = \frac{1}{\log G(0)} \log \frac{G(x \wedge 0)}{G(x)}, (x \wedge 0)_i = \min(x_i, 0). \quad (31)$$

Here, $G(x)$ is a multivariate GEV distribution function, $$G(x) = G_*\left(\left(1 + \frac{\xi(x-\mu)}{\sigma}\right)_+^{1/\xi}\right), \quad (32)$$

$$G_*(x) = \begin{cases} \exp(-m_*(x)), & x \geq 0 \\ 0 & \text{otherwise} \end{cases}$$

and $m_*(x)$ is a suitable dependence function (possibly depending on u) such as a logistic model of the form $$m_*(x) = \left(\sum_{i=1}^{p} w_i x_i^{-1/\kappa}\right)^\kappa, x = (x_1, \ldots, x_p) \geq 0, \quad (33)$$

with weights $w_i > 0$ and logistic index $0 < \kappa \leq 1$.

For the multivariate POT model of Eq. (30) deployed with the logistic dependence function of Eq. (33), the predetermined distribution is, therefore, $$P(X^u \leq x) \approx H_u(x) = \quad (34)$$

$$\left(\sum_{i=1}^{p} w_i^u \left(1 + \frac{\xi_i(x_i \wedge 0)}{\sigma_i^u}\right)_+^{-\frac{1}{\kappa_i}}\right)^\kappa - \left(\sum_{i=1}^{p} w_i^u \left(1 + \frac{\xi_i x_i}{\sigma_i^u}\right)_+^{-\frac{1}{\kappa_i}}\right)^\kappa,$$

with normalised weights, $$\sum_{i=1}^{p} w_i^u = 1.$$

The plurality of parameters of the predetermined distribution of Eq. (34) are $\theta=\theta_u=(\xi, \sigma_u, w_u, \rho_u, \kappa)$, where $\xi=(\xi_i, \ldots, \xi_p)$, $\sigma_u=(\sigma_1^u, \ldots, \sigma_p^u)$, $w_u=(1^u, \ldots, w_p^u)$. The joint exceedance rate, $\rho_u$, is defined by $$\rho_u = P(X(t) \not\leq u). \quad (35)$$

As the joint exceedance rate is dependent on the threshold u, it can be efficiently updated for a new threshold, u+v, using algebraic formulas such that $$\rho_{u+v} = \rho_u(1-H_u(v))v \propto u). \quad (36)$$

where the function $H_u(x)$ is defined in Eq. (34).

The plurality of parameters, $\theta=\theta_u=(\xi, \sigma_u, w_u, \rho_u, \kappa)$, of the predetermined distribution of Eq. (34) are estimated using the Markov chain Monte Carlo (MCMC) sampling technique using the acceptance probability of the form in Eq. (5) as described above (with the corresponding change in the data notation, i.e., replacing M by X). As such, a joint posterior density of the plurality of parameters is estimated using an MCMC, estimator. The MCMC estimator obtains the joint posterior density of the plurality of parameters by combining a joint prior density of the plurality of parameters with the likelihood of the plurality of parameters based on the plurality of observed signals of interest and the one or more surrogate covariates.

As stated above, in some embodiments, the forecasting performed in the method 300 of FIG. 3 at the step of performing 304 a forecast is repeated over several iterations such that, after a first forecast has been performed, further input data is obtained, and a second forecast is performed on the further input data. In such examples, the joint posterior density of the plurality of parameters estimated during one iteration is used as the joint prior density of the plurality of parameters in a subsequent iteration. That is, when transitioning from a first forecast to a second forecast, the joint prior density of the plurality of parameters used during the second forecast corresponds to the joint posterior density of the plurality of parameters estimated during the first forecast.

When the plurality of signals of interest are non-stationary, the non-stationarity of the plurality of signals of interest, $(X(t))$, is captured by treating the parameters of the predetermined distribution of Eq. (34) as functions of the one or more covariates, $C(t)$, leading to the predetermined distribution $$P(X^u(t) \leq x \mid C(t) = c) \approx H_u(x; c) = \quad (37)$$

$$\left(\sum_{i=1}^{p} w_i^u(c)\left(1 + \frac{\xi_i(c)(x_i \wedge 0)}{\sigma_i^u(c)}\right)_+^{-\frac{1}{\kappa(c)\xi_i(c)}}\right)^{\kappa(c)} -$$

$$\left(\sum_{i=1}^{p} w_i^u(c)\left(1 + \frac{\xi_i(c)x_i}{\sigma_i^u(c)}\right)_+^{-\frac{1}{\kappa(c)\xi_i(c)}}\right)^{\kappa(c)}.$$

The plurality of parameters of the predetermined distribution of Eq. (37) are then determined by estimating the latent functional dependency of the plurality of parameters upon the one or more surrogate covariates. As such, the step of fitting 310 the statistical model of extremes may further comprise the step of determining the plurality of parameters by estimating the latent functional dependency of the plurality of parameters upon the one or more surrogate covariates.

The latent functional dependency of the plurality of parameters upon the one or more surrogate covariates is estimated using one or more machine learning models. In one embodiment, the one or more machine learning models correspond to a regression model comprising a plurality of regression parameters, wherein the one or more surrogate covariates correspond to explanatory variables of the regression model and the plurality of parameters correspond to dependent variables of the regression model.

To preserve threshold stability, the following links are used:

$$\sigma_u(c) = \alpha(c) + (u - u_0)\beta(c), \xi(c) = \beta(c), \tag{38}$$

and $$\log \rho_u(c) = \gamma(c) + \log\left(1 - H\left(\frac{u - u_0}{\alpha(c)}\right)\right), \tag{39}$$

where $u_0$ is a preset calibration threshold, $\alpha(c) = \sigma_{u_0}(c)$, and $\gamma(c) = \log \rho_u(c)$. Like in the univariate case (see Eq. (24) and Eq. (25)), the specific choice of the calibration threshold $u_0$ in Eq. (38) and Eq. (39) is chosen such that it is close to the required range of thresholds u (so that the difference $u-u_0$ is small as compared to u). In practice, the calibration threshold $u_0$ is selected for the sake of computational convenience, for example, as the vector of 95% empirical quantiles in each component of the pooled data.

Note that in the formulas in Eq. (38) and Eq. (39), the vector coefficients $\alpha(c)$ and $\beta(c)$ are functions of the one or more covariates $c \in \mathbb{R}^m$ subject to the constraint $\alpha(c)+(u-u_0)\beta(c)>0$, while $\gamma(c)$ must guarantee that the right-hand side of Eq. (39) stays negative. In turn, these functions are estimated via a linear regression model on the covariates, $$\alpha(c)=A\check{c}^T, \beta(c)=B\check{c}^T, \gamma(c)=g\check{c}^T, \tag{40}$$

where $\check{c}=(1, c_1, \ldots, c_m)$, $A=(a_{ij})$ and $B=(ij)$ are matrices of size $p \times (m+1)$, and $g=(g_0, g_1, \ldots, g_m)$. A regression framework is also used to estimate the logistic index $\kappa=\kappa(c)$ and the weights $(w_i^u(c))$, $$\text{logit } \kappa(c) = k\check{c}^T, \log\left(\frac{(w_i^u(c))}{(w_p^u(c))}\right) = t_i^u \check{c}^T \ (i = 1, \ldots, p-1), \tag{41}$$

where $k=(k_0, k_1, \ldots, k_m)$ and $t_i^u=(t_{i0}^u, t_{i1}^u, \ldots, t_i^u)$. Once the vectors $t_i^u$ have been estimated for $i=1, \ldots, p-1$, the estimates for the weights are obtained as $$\hat{w}_p^u(c) = \frac{1}{1 + \Sigma_{i=1}^{p-1} \exp(\hat{t}_i^u \check{c}^T)} \tag{42}$$

$$\hat{w}_i^u(c) = \hat{w}_p^u(c)\exp(\hat{t}_i^u \check{c}^T) = \frac{\exp(\hat{t}_i^u \check{c}^T)}{1 + \Sigma_{i=1}^{p-1} \exp(\hat{t}_i^u \check{c}^T)} \ (i = 1, \ldots, p-1).$$

As a result, by substituting the estimated parameters given by Eq. (42) back in Eq. (37), the predetermined distribution MGPD is fully specified and is thus usable for forecasting future extremes at the required time step(s).

In an embodiment, the plurality of parameters of the predetermined distribution of Eq. (37) are estimated using the Markov chain Monte Carlo (MCMC) sampling technique using the acceptance probability analogous to Eq. (5) as described above. As such, a joint posterior density of the plurality of regression parameters is estimated using an MCMC, estimator. The MCMC estimator obtains the joint posterior density of the plurality of regression parameters by combining a joint prior density of the plurality of regression parameters with the likelihood of the plurality of regression parameters based on the plurality of observed signals of interest and the one or more surrogate covariates.

As stated above, in some embodiments the forecasting performed in the method 300 of FIG. 3 at the step of performing 304 a forecast is repeated over several iterations such that, after a first forecast has been performed, further input data is obtained, and a second forecast is performed on the further input data. In such examples, the joint posterior density of the plurality of regression parameters estimated during one iteration is used as the joint prior density of the plurality of regression parameters in a subsequent iteration. That is, when transitioning from a first forecast to a second forecast, the joint prior density of the plurality of regression parameters used during the second forecast corresponds to the joint posterior density of the plurality of regression parameters estimated during the first forecast.

In summary, the forecasting performed in the method 300 of FIG. 3 at the step of performing 304 obtains a fitted statistical model of extremes defined according to a predetermined distribution. Both the predetermined distribution and the means by which the plurality of parameters of the predetermined distribution are obtained are dependent on the approach taken (e.g., block maxima or POT), the stationarity of the data, and whether the data is univariate or multivariate. The fitted statistical model of extremes comprises a predetermined distribution comprising a plurality of parameters having values determined as a result of the fitting. The fitted statistical model of extremes is then employed to provide probabilistic forecasts of future extreme values.

Step 312: Obtaining a Probabilistic Forecast of Future Extremes

The method 300 further comprises, as part of the first forecast, obtaining 312 a probabilistic forecast of future extreme values based on the fitted statistical model of extremes for one or more future time steps.

The fitted statistical model of extremes is used to produce probabilistic forecasts of future extreme values. Specifically, the plurality of parameters of the predetermined distribution of the fitted statistical model of extremes are used to produce probabilistic forecasts of future extreme values. The probabilistic forecast of future extreme values includes a point estimate and, optionally, credible intervals obtained by the fitted statistical model of extremes for the one or more future time steps. For POT approaches, the probabilistic forecast of future extreme values further comprises an exceedance probability. In one embodiment, the probabilistic forecast of future extremes is obtained analytically using the explicit form of the fitted statistical model of extremes. Alternatively, the probabilistic forecast of future extremes is obtained empirically by simulating the fitted statistical model of extremes samples.

When the plurality of signals of interest are multivariate, the analytical properties of the MGPD, which are required for the calculation of confidence regions, future return levels, and for efficient sampling from the MGPD, are difficult to obtain. To address this, samples are simulated from the MGPD. Beneficially, this provides an efficient method for sampling from the MGPD which is both direct (i.e., unsupervised) and universal (i.e., the range of simulated vector values covers the entire domain of the multivariate extremes).

Specifically, the density of the MGPD distribution of Eq. (34) (in the main case where the logistic index κ in the range $0<\kappa<1$) is given by $$f_Y(y) = \frac{(-1)^{p-1}(\kappa)_p(y_1+\ldots+y_p)^\kappa}{(y_1^0+\ldots+y_p^0)^\kappa}, y \not\geq y^0, \quad (43)$$

where $(\kappa)_p = \kappa(\kappa-1) \ldots (\kappa-p+1)$ and $y^0$ is a certain reference point defined by a standardising transformation of the original random vector $(X_1, \ldots, X_p)$ leading to the new vector $(Y_1, \ldots, Y_p)$. To address the issues regarding a direct sampling from this density, the radial decomposition is used. Namely, $Z = Y_1 + \ldots + Y_p$, which has been shown to have the distribution function $$F_Z(z) = \frac{(-1)^{p-1}(\kappa)_p(z^\kappa - \psi_{z_0}(z))}{\kappa z_0^\kappa (p-1)!}, z \geq 0, \quad (44)$$

where $z_0 = y_1^0 + \ldots + y_p^0$ and $$\psi_{z_0}(z) = \kappa \int_0^z w^{\kappa-p}(w-z)_+^{p-1} dw, z \geq 0. \quad (45)$$

More explicitly, $\psi_{z_0}(z) = 0$ for $z \leq z_0$ and $$\psi_{z_0}(z) = \kappa \sum_{i=0}^{p-1} \binom{p-1}{i}(-z_0)^i \frac{z^{\kappa-i} - z_0^{\kappa-i}}{\kappa - i}, z > z_0. \quad (46)$$

Hence, the density of Z is given by $$f_Z(z) = \frac{(-1)^{p-1}(\kappa)_p(z^{\kappa-1} - z^{\kappa-p}(z-z_0)_+^{p-1})}{z_0^\kappa(p-1)!}, z > 0. \quad (47)$$

In view of these formulas, it is straightforward to sample the random variable Z.

In turn, conditionally on $Z = z \geq 0$, the distribution of the random vector Y is uniform on the perforated simplex $$S_p(z; y^0) = \begin{cases} \Delta_{p-1}(z) \text{ if } z < z_0, \\ \Delta_{p-1}(z) \backslash (y^0 + \Delta_{p-1}(z - z_0)) \text{ if } z \geq z_0 \end{cases}, \quad (48)$$

where $\Delta_{p-1}(z)$ is a standard (p−1)-simplex with lateral side z:

$$\Delta_{p-1}(z) = \{y \in \mathbb{R}^{p-1}: y_1 + \ldots + y_{p-1} \leq z\}. \quad (49)$$

Sampling from the uniform distribution on $S_p(z; y^0)$ is organised through successive uniform sampling of the coordinates $Y_j$ subject to dynamically updated constraints to ensure the condition in Eq. (48).

Step 314: Causing Control of a Controllable System

Optionally, the method 300 further comprises the step of causing 314 control of a controllable system based at least in part on the probabilistic forecast of future extremes.

As will be described in more detail below in relation to FIGS. 10 to 13, the probabilistic forecast of future extremes may be used to cause control of controllable systems such as blood glucose monitoring systems or environmental monitoring systems. In general, the probabilistic forecast of future extremes is used to indicate whether a system is predicted to be in an extremal (e.g., abnormal) state at one or more future time points. If such an extremal state is forecasted to occur, the controllable system is controlled to account for this extremal state. In one implementation, control of the controllable system occurs through the issuance of a command or message to the controllable system indicating the probabilistic forecast of future extremes. Alternatively, the probabilistic forecast of future extremes is obtained as part of the operation of the controllable system such that the controllable system is able to account for the forecast directly.

When using POT based approaches, the exceedance probability may be used to determine whether control of the controllable system should occur. For example, if the exceedance probability for a given future time step is low, then the method will not cause control of the controllable system (even if the predicted point estimate or credible intervals indicate a high or low extreme value for the given future time step). Therefore, in some embodiments, the step of causing 314 is conditional on the exceedance probability being greater than a predetermined threshold. The predetermined threshold is preferably greater than 0.5 and less than or equal to 1.0. More preferably, the predetermined threshold probability is greater than 0.75 and more preferably again greater than 0.9. In one embodiment, the predetermined threshold probability is adjusted by a user thereby altering the sensitivity of the system to alerting a user of predicted future extreme value.

By accurately and efficiently forecasting future extremes, as described above in relation to method 300, the controllable system is controlled to attempt to avoid future extreme states occurring. In application areas such as process control, predictively accounting for such extreme states may help improve the longevity and operation of the process. Within biomedical applications, predictively accounting for such extreme states may help improve patient health by enabling preventative action to be taken before an extreme health state (e.g., high or low blood glucose, or high heart rate) occurs. Moreover, efficiently forecasting future extremes within such applications allows such preventative action to be taken quickly.

In an alternative approach to the method described in relation to FIG. 3, a forecast is obtained by directly estimating the parameters of the statistical model of extremes using a trained deep learning model. This approach is shown in the method of FIG. 8.

Figure 8:
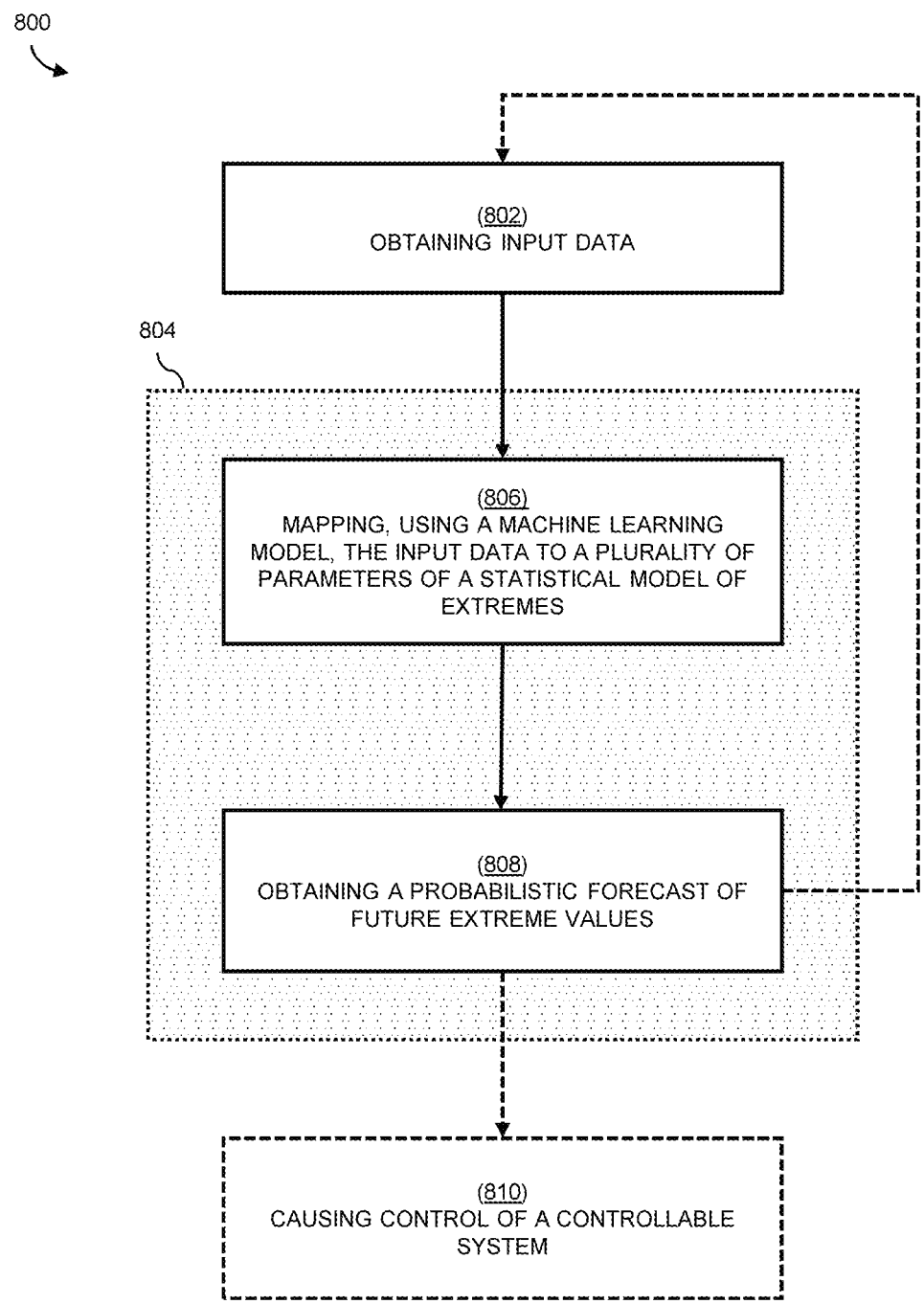
FIG. 8 shows a method performed by the system of FIG. 2 for producing probabilistic forecasts of extreme values according to an aspect of the present disclosure.

FIG. 8 shows a method 800 for producing probabilistic forecasts of extreme values according to an aspect of the present disclosure.

The method 800 comprises the step of obtaining 802 input data and performing 804 a first forecast. The step of performing 804 the first forecast comprises the steps of mapping 806, using a machine learning model, the input data to a plurality of parameters of a statistical model of extremes, and obtaining 808 a probabilistic forecast of future extreme values. Optionally, the method 800 further comprises the step of causing 810 control of a controllable system.

The step of obtaining 802 input data in the method 800 corresponds to the step of obtaining 802 input data in the method 300 described in relation to FIG. 3 above. The input data comprises a plurality of signals of interest and a plurality of covariates associated therewith.

The method 800 further comprises the step of performing 804 a first forecast based on the input data.

The first forecast corresponds to a probabilistic forecast of future extreme values obtained from the input data. In an embodiment the method 800 further comprises the step of obtaining further input data and performing a second forecast based on the further input data. Therefore, references below to operations performed as part of the first forecast are equally applicable to operations performed as part of a second forecast. Indeed, the forecasting may be repeated any number of times using further input data with the steps and operations described in relation to the first forecast being equally applicable thereto.

The method 800 further comprises, as part of the first forecast, mapping 806, using a machine learning model, the input data to a plurality of parameters of a statistical model of extremes.

The machine learning model corresponds to a trained machine learning model operable to map the plurality of signals and the plurality of covariates to a plurality of parameters of a predetermined distribution associated with the statistical model of extremes. In the present embodiment, the statistical model of extremes corresponds to a peaks-over-threshold (POT) approach with a generalised Pareto distribution (GPD) used as the predetermined distribution. A threshold, u, is obtained e.g., from a user or empirically from the data.

To provide a direct mapping from the input data to the plurality of parameters of the predetermined distribution, the neural network architectures described in relation to FIGS. 4 and 5A & B are used with a custom layer, described in relation to FIG. 9 below, being appended to the end of each architecture.

Figure 9:
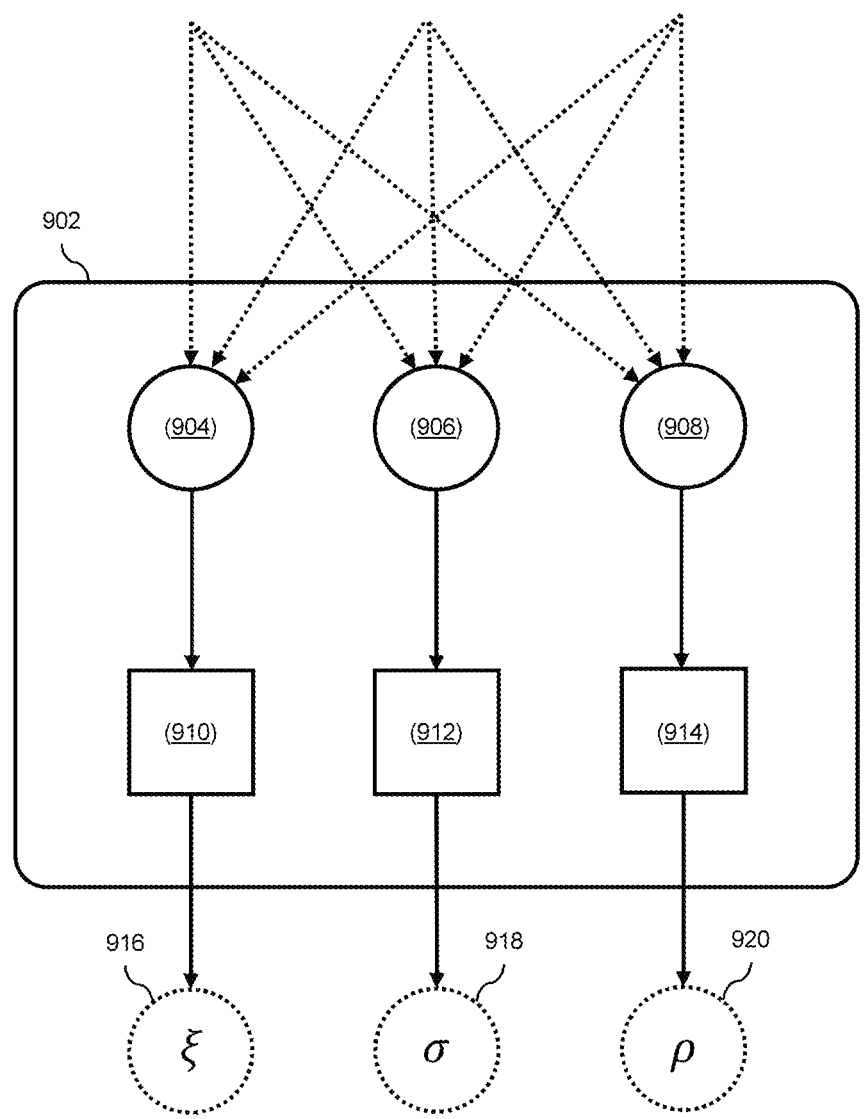
FIG. 9 shows a custom neural network layer for estimating the plurality of parameters of a generalised Pareto distribution according to one or more example aspects of the present disclosure.

FIG. 9 illustrates a custom neural network layer for estimating the plurality of parameters of a generalised Pareto distribution.

FIG. 9 shows a custom layer 902 for an artificial neural network such as the neural network 402 shown in FIG. 4 and the third neural network 506 shown in FIG. 5B. The custom layer comprises a first unit 904, a second unit 906, and a third unit 908. The first unit 904, the second unit 906, and the third unit 908 receive as input the three outputs of a previous layer (e.g., the outputs of the third dense layer 412 shown in FIG. 4 or the outputs of the second dense layer 520 as shown in FIG. 5B). The output of the first unit 904 is fed to a first activation function 910, the output of the second unit 906 is fed to a second activation function 912, and the output of the third unit 908 is fed to a third activation function 914. The custom layer 902 provides a first output 916, a second output 918, and a third output 920.

The first activation function 910 corresponds to a softplus function of the form $f(x)=\log(1+\exp(x))$. The second activation function 912 corresponds to a tanh function of the form $f(x)=(e^x-e^-)/(e^x+e^-)$. The third activation function 914 corresponds to a sigmoid function of the form $f(x)=1/(1+e^-)$. The first output 916 (i.e., the output of the first activation function 910) can be interpreted as an estimate of the shape parameter, $\xi$, of the GPD. The second output 918 can be interpreted as an estimate of the scale parameter, $\sigma$, of the GPD. The third output 920 can be interpreted as an estimate of the exceedance probability, $\rho$.

As such, the custom layer 902 serves to estimate the latent functional dependency of the plurality of parameters upon the one or more surrogate covariates (e.g., as determined using the neural network architectures described in relation to FIG. 4 and FIGS. 5A & 5B). Whilst the custom layer 902 is described primarily in reference to the neural network architectures described in relation to FIG. 4 and FIGS. 5A & 5B, the skilled person will appreciate that the custom layer 902 may be appended to any suitable neural network architecture or machine learning model architecture.

When mapping from a single covariate type (i.e., the neural network architecture of FIG. 4) the three outputs of the third dense layer 412 of the neural network 402 are fed as input to the custom layer 902 Consequently, the neural network outputs a triplet of values corresponding to the shape ($\xi$) and scale ($\sigma$) of the GPD along with the probability of threshold exceedance ($\rho$).

When mapping from multiple covariate types (i.e., the neural network architecture of FIGS. 5A and 5B) the three outputs of the second dense layer 520 of the third neural network 506 are fed as input to the custom layer 902. As before, the neural network thus outputs a triplet of values corresponding to the shape and scale of the GPD along with the exceedance probability.

An artificial neural network incorporating the custom layer 902 is trained using an Adam optimiser with the following loss function, $$\mathcal{F}_L(\rho_u(c), \xi_u(c), \sigma_u(c) \mid X) = \frac{1}{n}\sum_{i=1}^{n}\{-\log L(\rho_u(c_i), \xi_u(c_i), \sigma_u(c_i) \mid X_i) + \quad (50)$$

$$1_{\{\sigma_u+\xi_u(X_i-u)>0\}}\lambda(\|\rho'_u(c_i)\|_2 + \|\sigma'_u(c_i)\|_2 + \|\xi'_u(c_i)\|_2)\},$$

where $\rho_u(c)$, $\xi_u(c)$ and $\sigma_u(c)$ are the unknown functions of covariate vector c (given a fixed threshold u), which are estimated using a functional class implicitly determined by the neural network architecture, ($c_i$) are the recorded values of covariates associated with the signals of interest ($X_i$), respectively, and $L(\rho_u(c_i), \xi_u(c_i), \sigma_u(c_i)|X_i)$ is the likelihood per observation $X_i$ (cf. Eq. (19)), $$L(\rho_u(c_i), \xi_u(c_i), \sigma_u(c_i) \mid X_i) = \quad (51)$$

$$(1-\rho_u(c_i))^{1-u(X_i)}\left(\frac{\rho_u(c_i)}{\sigma_u(c_i)}\left(1+\frac{\xi(c_i)(X_i-u)}{\sigma_u(c_i)}\right)_+^{-\frac{1}{\xi_u(c_i)}}\right)^{\delta_u(X_i)}.$$

Here, $\delta_u(x)=1$ if $x>u$ and $\delta_u(x)=0$ otherwise. The penalty terms in Eq. (50) corresponds to restricting the gradient of the functions $\rho_u(c)$, $\xi_u(c)$ and $\sigma_u(c)$ with respect to variation of the vector argument c, with the tuning parameter $\lambda>0$. The value of $\lambda$ is initially set as any positive value, which is then adjusted as a hyper-parameter to optimise performance. Larger values of $\lambda$ lead to a slower varying output, while smaller values of $\lambda$ allow faster changes (i.e., bigger gradients).

In one example implementation, the Adam optimiser is initialised with parameters $\beta_1=0.9$, $\beta_2=0.999$, and $\varepsilon=10^{-7}$ and a learning rate of $10^{-5}$ is used. A batch size of 64 and an epoch size of 1500 are used and the weights are initialised using a Glorot Normal initialisation with all biases set to zero. As described in more detail below in relation to FIGS. 10-14, the artificial neural network incorporating the custom layer 902 is trained on a training data set comprising a plurality of signals or interest and a plurality of covariates associated therewith along with a plurality of parameters of the predetermined distribution.

Once trained, the machine learning model thus estimates a plurality of parameters of the predetermined distribution directly from a plurality of covariates.

Referring once again to FIG. 8, the steps of obtaining 808 a probabilistic forecast of future extreme values and causing 810 control of a controllable system based on the probabilistic forecast correspond to the steps of obtaining 312 and causing 314 of the method 300 described in relation to FIG. 3 above.

Beneficially, the use of the above-described neural network architecture, in particular the use of the final custom layer, allows the parameters of the predetermined distribution to be directly estimated from the input data. Thus, a single machine learning model is trained to map the covariates of the input data into a compressed representation and subsequently obtain the plurality of parameters of the predetermined distribution. This provides a direct and efficient mechanism for forecasting future extreme values. Moreover, the use of a single, monolithic, machine learning model to estimate the distribution parameters directly from the input data allows the forecasting method to be employed in application domains with limited computational resources.

The methods described in relation to FIGS. 3 and 8 find application within a wide range of technological domains such as healthcare, environmental monitoring, financial modelling, plant monitoring, and device control. Three example application areas are described below in relation to FIGS. 10-11, FIGS. 12-14, and FIGS. 15-16.

Figure 10:
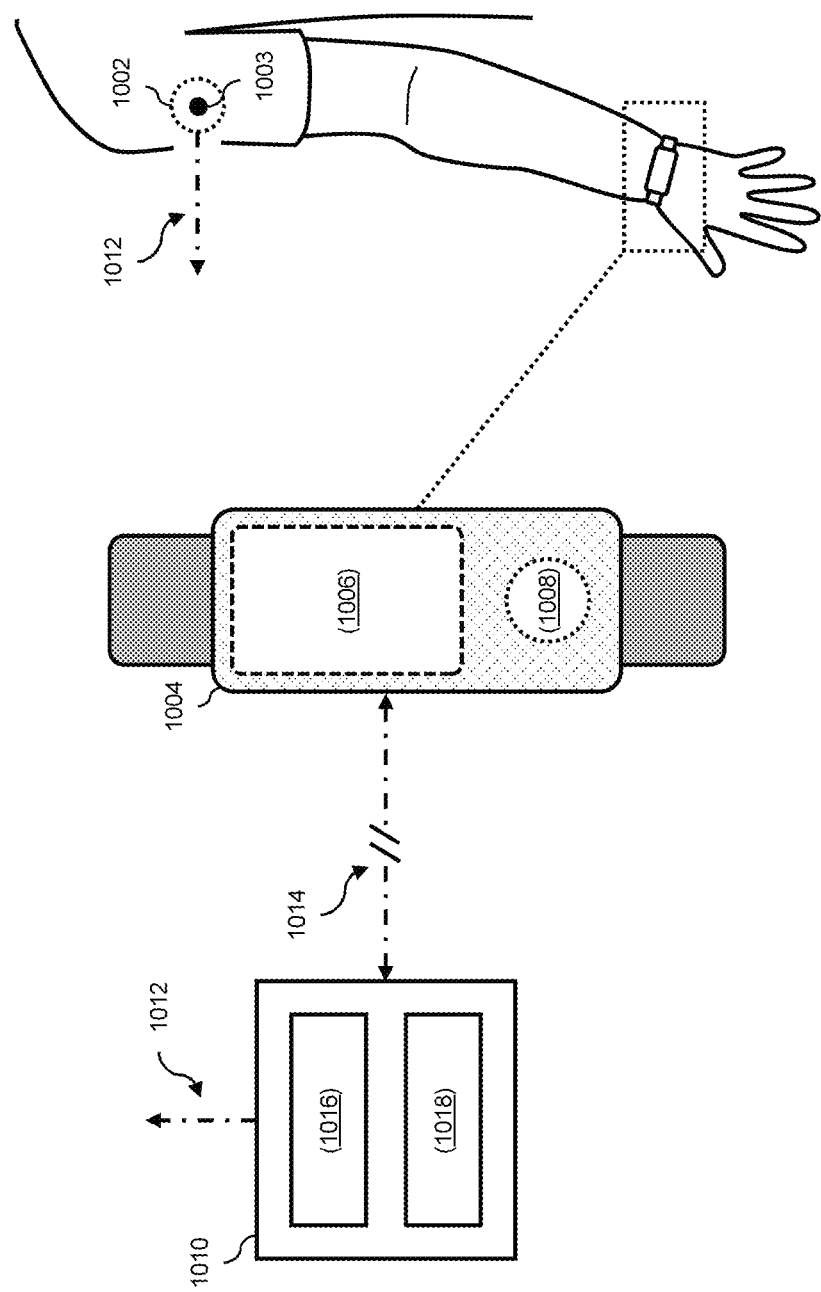
FIG. 10 shows a glucose monitoring system for producing probabilistic forecasts of extreme glucose levels.

FIG. 10 shows a glucose monitoring system for producing probabilistic forecasts of extreme glucose levels.

The glucose monitoring system comprises a tracking device 1002 comprising at least one sensor 1003 and an output unit 1004 configured to provide an output to a user. The output unit 1004 corresponds to a personal electronic device, such as a smartwatch or the like, and comprises a screen 1006 and a sensor 1008. The glucose monitoring system further comprises a control device 1010 communicatively coupled to the tracking device 1002 via a first communication channel 1012 and communicatively coupled to the output unit 1004 via a second communication channel 1014. The control device 1010 comprises a forecasting unit 1016 and an alerting unit 1018.

The at least one sensor 1003 of the tracking device 1002 is configured to measure a blood glucose level of a user of the tracking device 1002. The control device 1010 receives blood glucose measurements from the tracking device 1002. The blood glucose measurements are received periodically (e.g., every 1 second, 5 seconds, 10 seconds, seconds, 1 minute, 5 minutes, etc.) or, alternatively, are received upon sending a request from the control device 1010 to the tracking device 1002. The control device 1010 is further configured to receive a plurality of covariates corresponding to other biophysical signals received from a personal device of the user (e.g., as received by the sensor 1008 of the output unit 1004). The blood glucose measurements and the plurality of covariates are temporally aligned by timestamps included in the data.

The forecasting unit 1016 is configured to perform the steps of method 300 as described in relation to FIG. 3 above and/or the steps of the method 800 as described in relation to FIG. 8 above. As such, the forecasting unit 1016 obtains input data comprising glucose measurements (i.e., the plurality of signals of interest) and a plurality of covariates associated therewith and produces a probabilistic forecast of future extreme values corresponding to future extreme glucose levels.

In one example implementation, the method 300 is used. The one or more machine learning models comprise an empirical mode decomposition (EMD). Two peaks-over-threshold (POT) statistical models of extremes are used, both defined according to a generalised Pareto distribution (GPD). The GPD are fitted using a Markov Chain Monte Carlo (MCMC) approach. For the first statistical model of extremes an upper threshold is set at 170 mg/dL and for the second statistical model of extremes a lower threshold is set at 100 mg/dL. Both the first statistical model of extremes and the second statistical model of extremes are initially fitted using an MCMC algorithm on historical blood glucose measurements and corresponding covariates. Consequently, at the first iteration, fitting the statistical model of extremes comprises updating the parameters of the predetermined distribution based on the posterior distribution of the initial fitted statistical model of extremes.

Figure 11:
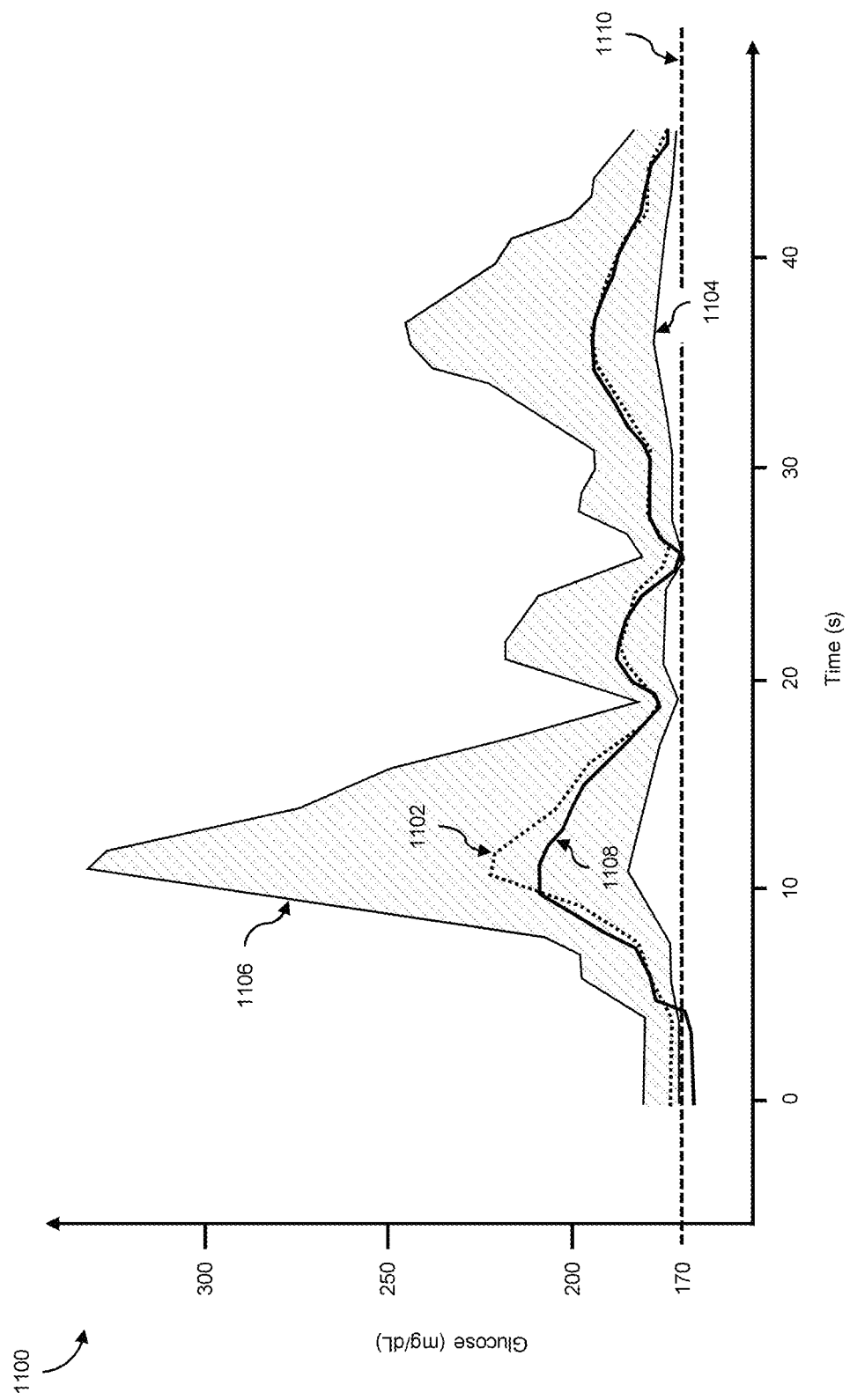
FIG. 11 shows a plot of predicted glucose levels produced by the system of FIG. 10.

The forecasting unit 1016, for a given future time step, obtains the plurality of covariates (e.g., from the sensor 1008 of the output unit 1004) and determines a probabilistic forecast of future extreme values based on the first and second fitted statistical model of extremes. FIG. 11 shows a probabilistic forecast obtained from the fitted first statistical model of extremes.

FIG. 11 shows a plot 1100 of predicted glucose levels produced by the system of FIG. 10.

The plot 1100 shows a probabilistic forecast of glucose levels comprising a mean 1102 shown as a dashed line, a 25% quantile 1104, and a 95% quantile 1106. The plot 1110 further shows the observed glucose levels 1108 shown as a solid line. The probabilistic forecast of glucose levels is obtained for a threshold 1110 set at 170 mg/dL. As can be seen, the mean 1102 of the fitted GPD closely tracks the observed glucose levels 1108.

Referring once again to FIG. 10, the alerting unit 1018 analyses the probabilistic forecast of future extreme values produced by the forecasting unit 1016. The probabilistic forecast of future extreme values comprises, for each time step, an exceedance probability, a point estimate (e.g., posterior mean or median), and a credible interval. For a given future time step, the alerting unit 1018 compares the exceedance probability to a predetermined threshold probability corresponding to the minimum probability at which a user should be alerted of a predicted future extreme glucose level. Preferably, the predetermined threshold probability is greater than 0.5 and less than or equal to 1.0. More preferably, the predetermined threshold probability is greater than 0.75 and more preferably again greater than 0.9. In one embodiment, the predetermined threshold probability is adjusted by a user thereby altering the sensitivity of the system to alerting a user of predicted future extreme glucose levels.

If the exceedance probability for the given future time step is less than the predetermined threshold probability, then the control device 1010 takes no further action and continues receiving input data and monitoring for future extremal states.

If the exceedance probability for the given future time step is greater than or equal to the predetermined threshold probability, then the control device 1010 instructs the alerting unit 1018 to cause an alert to be issued via the output unit 1004. The alert is for notifying the user of the forecast extremal state (i.e., the forecast extremely high or low glucose level).

In one embodiment, the alert comprises a warning message displayed on the screen 1006 of the output unit 1004. Alternatively, the alert comprises a tactile or audible alert issued via the output unit 1004 such as a vibration or an audible alarm.

The probabilistic forecast of future extreme values may thus be utilised to reduce the likelihood that a user experiences a hyperglycaemic or hypoglycaemic episode. By alerting the user of such an episode being predicted to occur the user can take early preventive action thereby reducing the likelihood of such an episode occurring.

Figure 12:
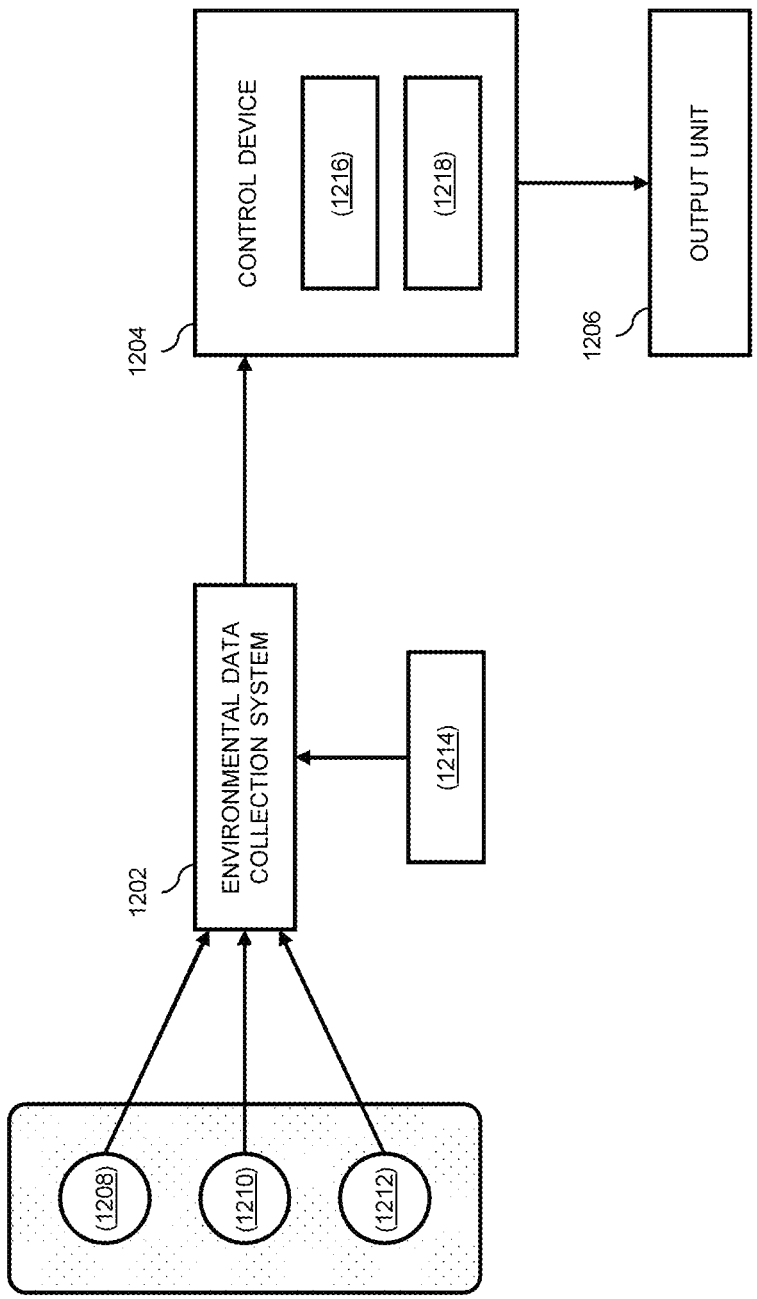
FIG. 12 shows an environmental monitoring system for producing probabilistic forecasts of extreme air quality concentrations.

FIG. 12 shows an environmental monitoring system for producing probabilistic forecasts of extreme air quality measures.

The environmental monitoring system comprises a tracking device 1202, a control device 1204, and an output unit 1206. The tracking device 1202 corresponds to an environmental data collection system and comprises a nitrogen oxide sensor 1208, a nitrogen dioxide sensor 1210, and an ozone sensor 1212. The tracking device 1202 receives metadata 1214 in the form of one or more covariates corresponding to, for example, weather and traffic conditions temporally aligned to the observations received from the sensors. The control device 1204 comprises a forecasting unit 1216 and an alerting unit 1218. The output unit 1206 presents an output to one or more users of the system based on information received from the alerting unit 1218.

In one example implementation, the three sensors are placed at a fixed geographical location within a city centre to monitor the concentration of the three pollutants at that location over time. The one or more covariates, included as part of the metadata 1214, correspond to weather and traffic conditions and other environmental data (e.g., satellite imaging) associated with that geographical location. To temporally align the covariates to the observations received from the sensors, timestamps are embedded within the observation data and the covariates.

The forecasting unit 1216 is configured to perform the steps of method 300 as described in relation to FIG. 3 above and/or the steps of the method 800 as described in relation to FIG. 8 above. As such, the forecasting unit 1216 obtains input data comprising high-frequency (e.g., 15 minutes) maximum concentrations of nitrogen oxide (NO), nitrogen dioxide ($NO_2$), and ozone ($O_3$) from the nitrogen oxide sensor 1208, the nitrogen dioxide sensor 1210, and the ozone sensor 1212 respectively. The forecasting unit 1216 further obtains a plurality of covariates in the form of the metadata 1214 associated with the input data. The forecasting unit 1216 produces a probabilistic forecast of future extreme values corresponding to future extreme NO, $NO_2$ and/or $O_3$ levels. In one example implementation, the forecasting unit 1216 fits three statistical models of extremes, one for each pollutant. In an alternative implementation, the forecasting unit 1216 fits a single multivariate model of extremes for a combination of the three pollutants.

The forecasting unit 1216 periodically (e.g., every 15 minutes, every 30 minutes, etc.) receives input data and corresponding metadata, updates the statistical model(s) of extremes based on the received data, and produces a probabilistic forecast of future extreme concentrations of one or more of the three pollutants for one or more future time steps.

In one example implementation, the forecasting unit 1216 utilises an end-to-end machine learning model to estimate, for one of the pollutants, the plurality of parameters of a generalised Pareto distribution (GPD) from the input data and corresponding covariates. In such an implementation, the plurality of covariates include tabular and image-based data. The tabular data comprises 81 covariates including timestamp information, traffic-related and meteorological variables (e.g., temperature, wind speed, wind direction, humidity, radiation, and traffic flow), lagged concentration values, and some time-dependent composite variables to account for the seasonal variability. The image-based data comprises 256×256 pixel RGB satellite images of the zones where the meteorological indicators were collected for the tabular data.

Prior to first use, a neural network architecture, such as that described in relation to FIG. 5A and FIG. 9, is trained on a training dataset comprising 19,194 rows of tabular data and a corresponding set of 19,194 images. Further details regarding training such an architecture are given above in relation to FIG. 8.

The forecasting unit 1216 utilises the trained neural network architecture to map from covariates to the parameters of the predetermined distribution. As the values of the covariates at a future time step (for which a prediction is sought) are not necessarily known, the probabilistic forecast of future extreme values is obtained for a future time step using the most recent covariates.

The alerting unit 1218 analyses the probabilistic forecast of future extreme values produced by the forecasting unit 1216. The probabilistic forecast of future extreme values comprises a set of probabilities that a future extreme event will occur at one or more future time steps along with corresponding point estimates and credible intervals. For example, for a future time step corresponding to an hour in the future, the probabilistic forecast of future extreme values corresponds to the probability that an extreme event—in this case, an extremely high level an atmospheric pollutant such as NO, $NO_2$, or $O_3$—will occur along with a corresponding point estimate (e.g., posterior mean or median) and credible intervals. This is illustrated in FIG. 13.

Figure 13:
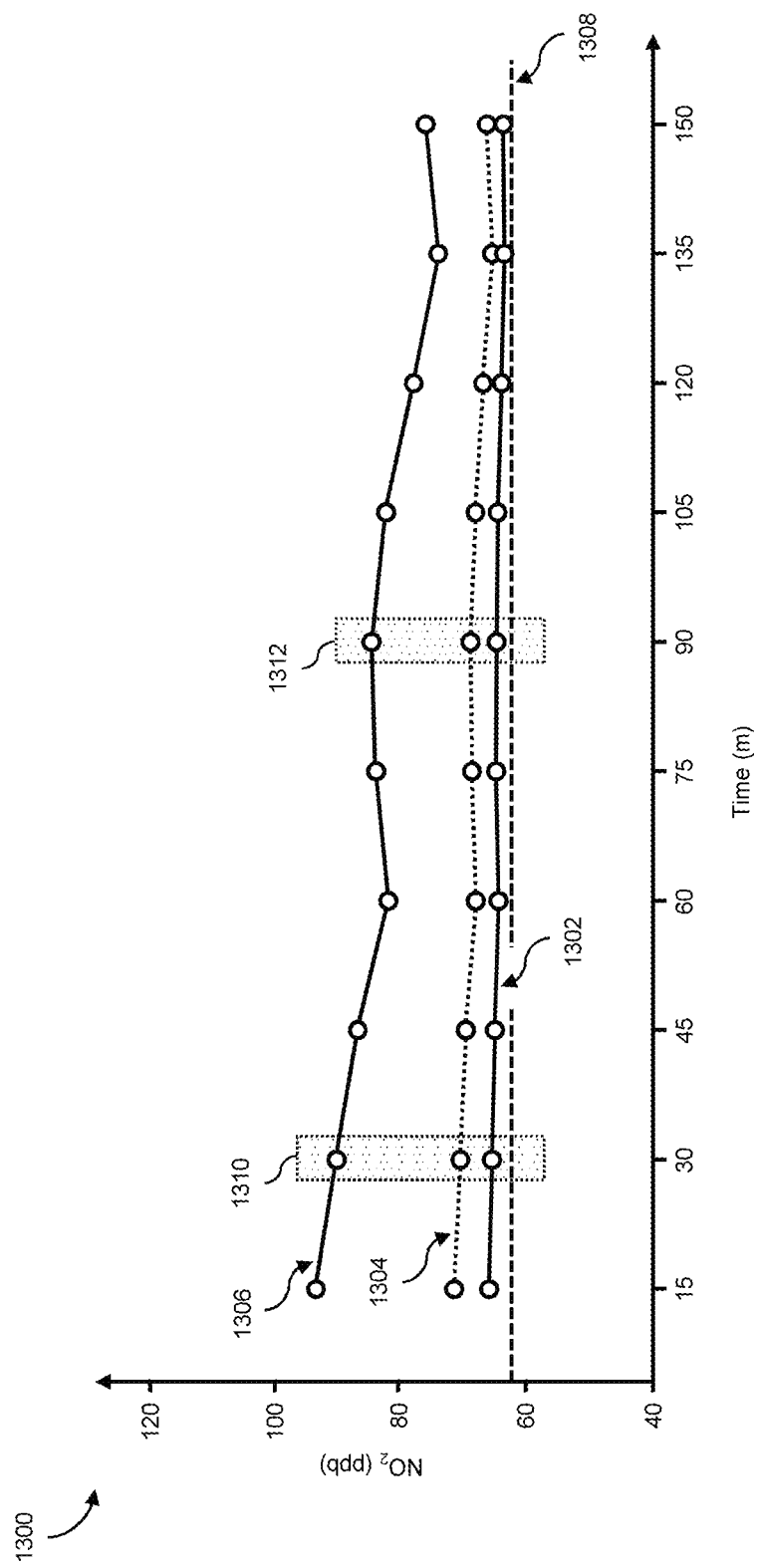
FIG. 13 shows a plot of predicted extreme pollutant levels produced by the system of FIG. 12.

FIG. 13 shows a plot 1300 of predicted extreme $NO_2$ levels produced by the system of FIG. 12.

The plot 1300 shows a 25% quantile 1302, a 50% quantile 1304, and a 90% quantile 1306 of a fitted statistical model of extremes relating to $NO_2$ exceedances over time. The statistical model of extremes corresponds to a POT approach with a threshold 1308 set empirically at the 85% of the data. FIG. 13 further shows a first region 1310 corresponding to the credible intervals for a first time point and a second region 1312 corresponding to the credible intervals for a second time point.

The probability of a threshold exceedance at the first time point is estimated from the probabilistic forecast of future extreme values as 32% whilst the probability of a threshold exceedance at the second time point is estimated as 6%. Thus, whilst the distributions shown in the first region 1310 and the second region 1312 are similar, the likelihood of there being a threshold exceedance at the second time point is much lower.

Whilst the example shown in FIG. 13 relates to univariate forecasting, the system described in FIG. 12 may also be applied to multivariate forecasting. This is illustrated in FIG. 14.

Figure 14:
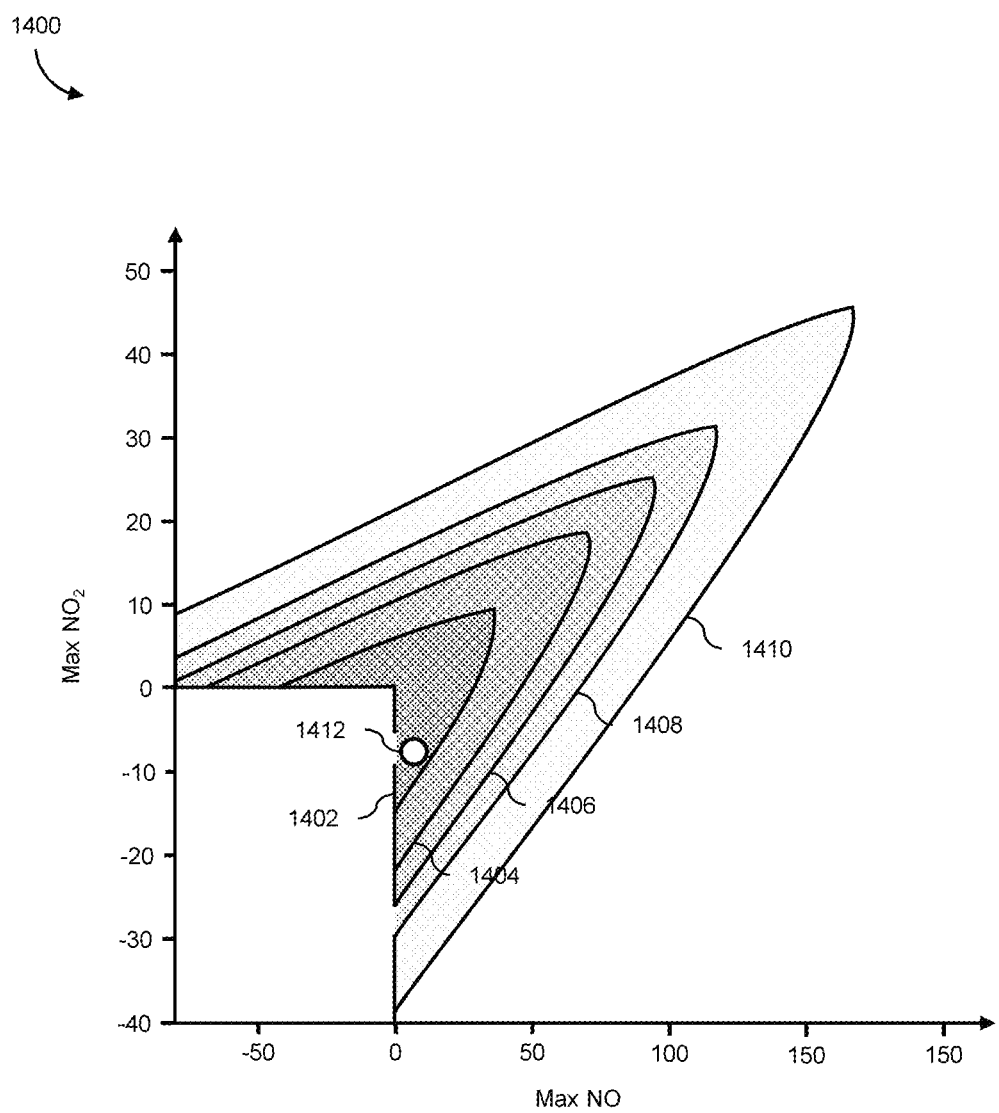
FIG. 14 shows a quantile level plot of a probability distribution for a pair of pollutants produced by the system of FIG. 12.

FIG. 14 shows a quantile level plot 1400 of a probability distribution for a pair of pollutants produced by the system of FIG. 12.

The quantile level plot 1400 shows a 50% quantile 1402, an 80% quantile 1404, a 90% quantile 1406, a 95% quantile 1408, a 99% quantile 1410, and an observation 1412. The quantiles (such as the 50% quantile 1402, etc.) are determined by the system of FIG. 12 as a result of fitting an MGPD. The quantile level plot 1400 thus represents the multivariate probability distribution of a threshold exceedance for the pair of pollutants NO and $NO_2$ at a given time point.

Referring once again to FIG. 12, the alerting unit 1218 analyses the exceedance probability of the probabilistic forecast of future extreme values for a given future time step. The alerting unit 1218 compares the exceedance probability to a predetermined threshold probability corresponding to the minimum probability at which control of the controllable system should occur. Preferably, the predetermined threshold probability is greater than 0.5 and less than or equal to 1.0. More preferably, the predetermined threshold probability is greater than 0.75 and more preferably again greater than 0.9. In one embodiment, the predetermined threshold probability is adjusted by a user thereby altering the sensitivity of the system to causing control of the controllable system based on the predicted future extreme pollutant levels.

In the system shown in FIG. 12, causing control of the controllable system comprises issuing an alert to a user via the alerting unit 1218. In one example implementation, the alert comprises a visible or audible warning displayed on a computer or device associated with the user. Alternatively, the alert comprises a command sent to an external system such as a traffic control system. The external system may then alter its operation based on the alert. For example, a traffic control system, upon receiving an alert indicating that an extreme level of atmospheric pollutants is predicted at a future time step for a geographical location, may alter traffic flow at that geographical location by rerouting traffic within the geographical location or preventing further traffic from entering the geographical location. The probabilistic forecast of future extreme values may thus be used to mitigate the likelihood of dangerous or harmful atmospheric pollutants building up within a geographical location.

Figure 15:
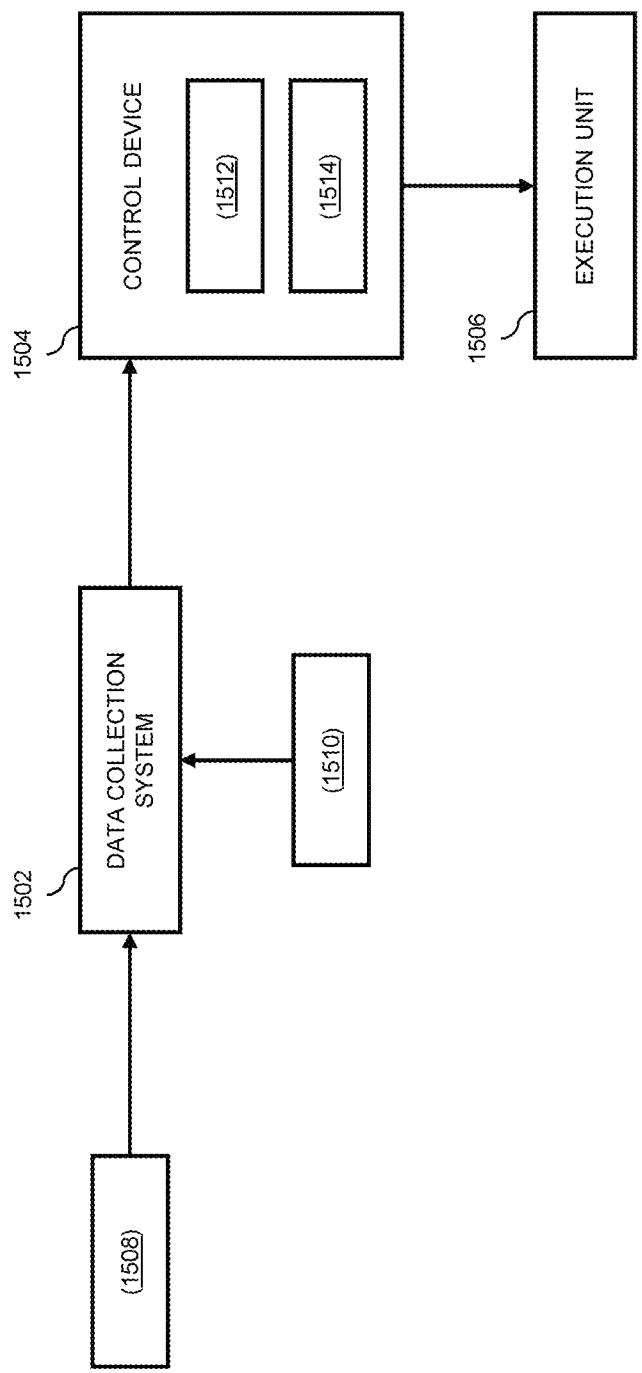
FIG. 15 shows an automated trading system for producing probabilistic forecasts of extreme financial assets.

FIG. 15 shows an automated trading system for producing probabilistic forecasts of extreme financial assets.

The automated trading system comprises a tracking device 1502, a control device 1504, and an output unit 1506. The tracking device 1502 and the execution unit 1506 are communicatively coupled to the control device 1504. The tracking device 1502 corresponds to a data collection system and receives input data comprising signals of interest 1508 corresponding to price information of one or more financial assets and associated covariates 1510. The output unit 1506 corresponds to an execution unit which executes a trade based on data received from the control device 1504. The control device 1504 comprises a forecasting unit 1512 and an alerting unit 1514.

The tracking device 1502 periodically receives price information (signals of interest 1508) corresponding to an asset, or stock, of interest. Thus, the tracking device 1502 acts as a sensor capable of receiving financial signals. The covariates 1510 received by the tracking device 1502 correspond to temporally aligned data such as price information of a plurality of other assets, or stocks. For example, the price information contains the open and close price of all S&P500 stocks. The input data (i.e., the signals of interest 1508 and the covariates 1510) are periodically received (e.g., every 1 second, 1 minute, 10 minutes, 1 hour, 1 day, 1 week, or the like) and sent to the control device 1504. The forecasting unit 1512 of the control device 1504 then utilises the input data to update a statistical model of extremes and produce a probabilistic forecast of extreme values at one or more future time steps (e.g., 1 second in the future, 1 minute in the future, 1 hour in the future, etc.).

The forecasting unit 1512 is configured to perform the steps of method 300 as described in relation to FIG. 3 above and/or the steps of method 800 as described in relation to FIG. 8 above. In one example implementation, the method 300 is used. The one or more machine learning models comprise an empirical mode decomposition (EMD). Two peaks over threshold (POT) statistical model of extremes are used, both defined according to a generalised Pareto distribution (GPD). The first statistical model of extremes is used to model upper extreme asset prices and the second statistical model of extremes is used to model lower extreme asset prices. The GPD are fitted using a Markov Chain Monte Carlo (MCMC) approach. Both the first statistical model of extremes and the second statistical model of extremes are initially fitted using an MCMC algorithm on historical price information for the stock of interest and corresponding covariates. Consequently, at the first iteration, fitting the statistical model of extremes comprises updating the parameters of the predetermined distribution based on the posterior distribution of the initial fitted statistical model of extremes.

The forecasting unit 1512, for a given future time step, obtains the plurality of covariates and determines a probabilistic forecast of future extreme values based on the first and second fitted statistical model of extremes. The alerting unit 1514 sends the probabilistic forecast of extreme values to the output unit 1506 which determines whether to execute a trade (e.g., buy, sell, stop loss, etc.) based on the probabilistic forecast.

The system of FIG. 15 was tested over a one year period on a portfolio of 15 S&P500 stocks—the top five, average five, and bottom five stocks of 2021. For each stock, an upper and a lower statistical model of extremes was fitted and used to forecast future probabilistic extreme values which drove the trading signals (as described above). The results for one stock over a 25 week testing period are shown in FIG. 16.

Figure 16:
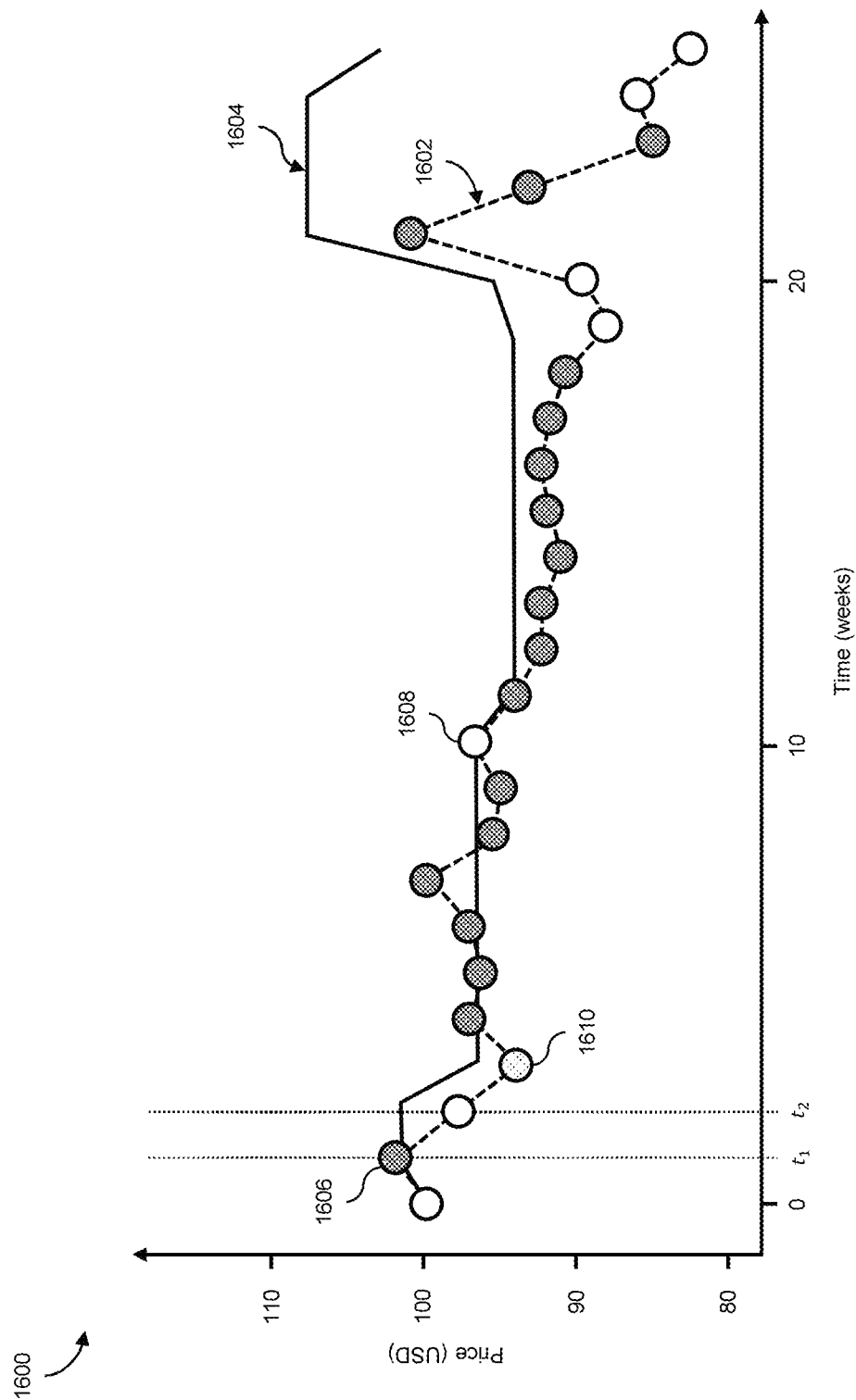
FIG. 16 shows a plot of stock prices along with forecasted signals produced by the system of FIG. 15.

FIG. 16 shows a plot 1600 of stock prices along with forecasted signals produced by the system of FIG. 15.

The plot 1600 shows the price 1602 of a stock (CLX on the NYSE) over a period of 25 weeks. The plot 1600 further shows the forecast of extremes 1604 produced according to the first statistical model of the forecasting unit 1516. A plurality of signals are also shown including a buy signal 1606, a sell signal 1608, and a stop loss signal 1610.

The plurality of signals are generated by the output unit 1504 of FIG. 15 in response to the forecast of extremes 1604 for a future time step. For example, at time step $t_1$, the probabilistic forecast of future extremes at time step $t_2$ is used to determine which signal to employ at time step $t_1$. In this example, the trading strategy employed by the output unit 1504 determines to execute a buy signal (i.e., the buy signal 1606).

With an assumed trading cost of 0.1%, the system of FIG. 15 achieved an annual yield of 43% with a Sharpe ratio of 1.51 over the one year period. The system outperformed a benchmark portfolio of the same stocks over the same period which achieved an annual yield of 27% with a Sharpe ratio of 0.71.

Figure 17:
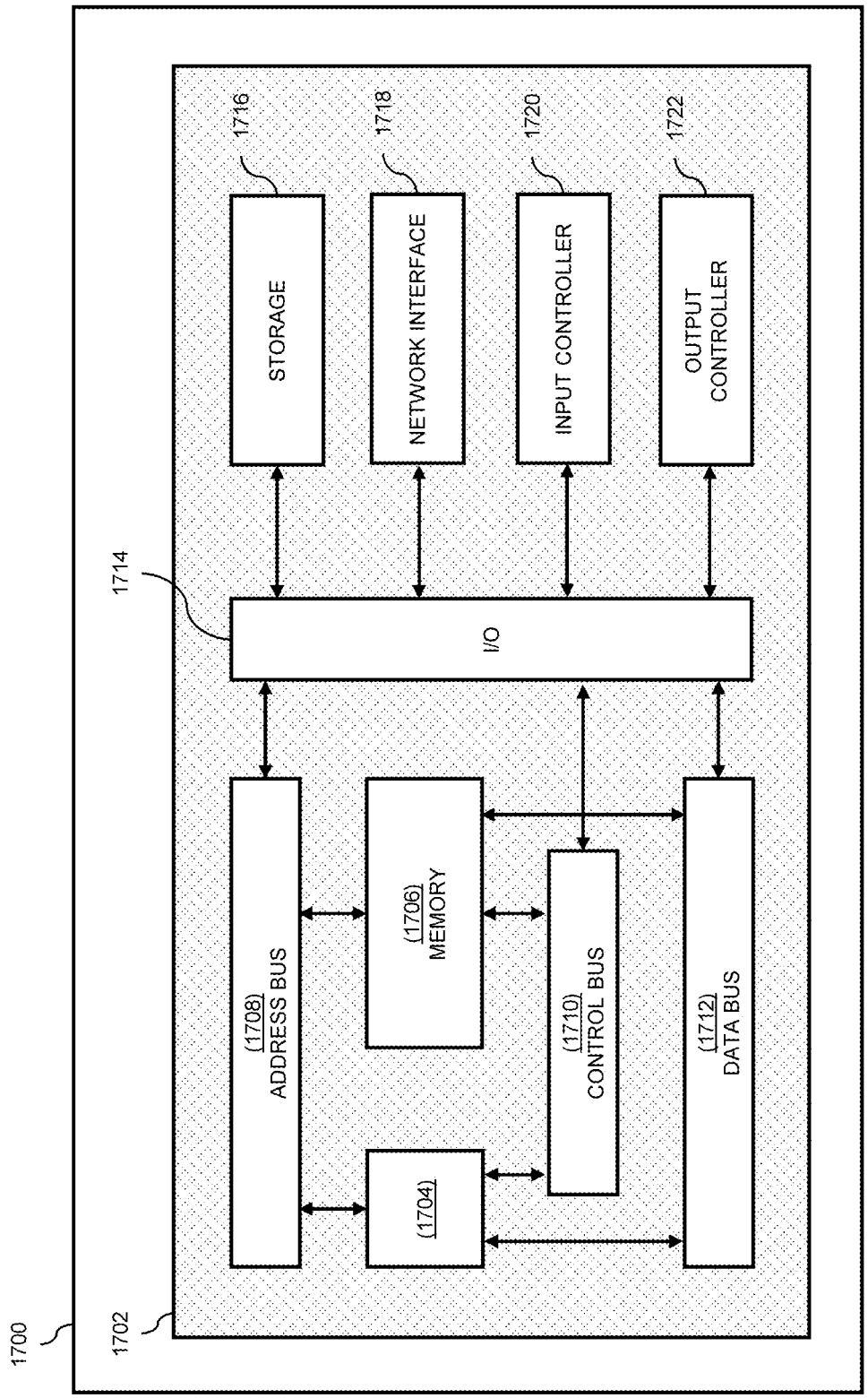
FIG. 17 shows an example computing system for carrying out the methods of the present disclosure.

FIG. 17 shows an example computing system for carrying out the methods of the present disclosure. Specifically, FIG. 17 shows a block diagram of an embodiment of a computing system according to example aspects and embodiments of the present disclosure.

Computing system 1700 can be configured to perform any of the operations disclosed herein such as, for example, any of the operations discussed with reference to FIGS. 2 to 8. Computing system includes one or more computing device(s) 1702. One or more computing device(s) 1702 of computing system 1700 comprise one or more processors 1704 and memory 1706. One or more processors 1704 can be any general-purpose processor(s) configured to execute a set of instructions. For example, one or more processors 1704 can be one or more general-purpose processors, one or more field programmable gate array (FPGA), and/or one or more application specific integrated circuits (ASIC). In one embodiment, one or more processors 1704 include one processor. Alternatively, one or more processors 1704 include a plurality of processors that are operatively connected. One or more processors 1704 are communicatively coupled to memory 1706 via address bus 1708, control bus 1710, and data bus 1712. Memory 1706 can be a random-access memory (RAM), a read-only memory (ROM), a persistent storage device such as a hard drive, an erasable programmable read-only memory (EPROM), and/or the like. One or more computing device(s) 1702 further comprise input/output (I/O) interface 1714 communicatively coupled to address bus 1708, control bus 1710, and data bus 1712.

Memory 1706 can store information that can be accessed by one or more processors 1704. For instance, memory 1706 (e.g. one or more non-transitory computer-readable storage mediums, memory devices) can include computer-readable instructions (not shown) that can be executed by one or more processors 1704. The computer-readable instructions can be software written in any suitable programming language or can be implemented in hardware. Additionally, or alternatively, the computer-readable instructions can be executed in logically and/or virtually separate threads on one or more processors 1704. For example, memory 1706 can store instructions (not shown) that when executed by one or more processors 1704 cause one or more processors 1704 to perform operations such as any of the operations and functions for which computing system 1700 is configured, as described herein. In addition, or alternatively, memory 1706 can store data (not shown) that can be obtained, received, accessed, written, manipulated, created, and/or stored. In some implementations, one or more computing device(s) 1702 can obtain from and/or store data in one or more memory device(s) that are remote from the computing system 1700.

Computing system 1700 further comprises storage unit 1716, network interface 1718, input controller 1720, and output controller 1722. Storage unit 1716, network interface 1718, input controller 1720, and output controller 1722 are communicatively coupled via I/O interface 1714.

Storage unit 1716 is a computer readable medium, optionally a non-transitory computer readable medium, comprising one or more programs, the one or more programs comprising instructions which when executed by one or more processors 1704 cause computing system 1700 to perform the method steps of the present disclosure. Alternatively, storage unit 1716 is a transitory computer readable medium. Storage unit 1716 can be a persistent storage device such as a hard drive, a cloud storage device, or any other appropriate storage device.

Network interface 1718 can be a Wi-Fi module, a network interface card, a Bluetooth module, and/or any other suitable wired or wireless communication device. In an embodiment, network interface 1718 is configured to connect to a network such as a local area network (LAN), or a wide area network (WAN), the Internet, or an intranet.

FIG. 17 illustrates one example computing system 1700 that can be used to implement the present disclosure. Other computing systems can be used as well. Computing tasks discussed herein as being performed at and/or by one or more functional unit(s) can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

What is claimed is:

1. A computer-implemented method for producing probabilistic forecasts of extreme values, the method comprising:
    (a) obtaining, from one or more sensors of a controllable system, input data comprising a plurality of signals of interest and a plurality of covariates associated therewith, each covariate of the plurality of covariates having an associated data type;
    (b) performing a first forecast based on the input data, wherein performing the first forecast comprises:
    (c) obtaining one or more trained machine learning models, each trained machine learning model of the one or more trained machine learning models having been trained to map one or more covariates of a respective data type to one or more surrogate covariates;
    (d) mapping, using the one or more trained machine learning models and the input data, the plurality of covariates to one or more surrogate covariates, the one or more surrogate covariates corresponding to a compressed representation of the input data;
    (e) fitting a statistical model of extremes to the plurality of signals of interest and the one or more surrogate covariates thereby generating a fitted statistical model of extremes, the statistical model of extremes being defined according to a predetermined distribution having a plurality of parameters; and
    (f) obtaining a probabilistic forecast of future extreme values based on the fitted statistical model of extremes for one or more future time steps; and
    (g) causing control of the controllable system based at least in part on the probabilistic forecast of future extremes.

2. The computer-implemented method of claim 1 wherein the controllable system comprises a glucose monitoring system such that the probabilistic forecast of future extreme values corresponds to a predicted high or low blood glucose level at the one or more future time steps.

3. The computer-implemented method of claim 2 wherein the one or more sensors comprise a blood glucose level sensor such that the plurality of signals of interest comprise blood glucose levels obtained from the blood glucose level sensor.

4. The computer-implemented method of claim 1 wherein the controllable system comprises an environmental monitoring system such that the probabilistic forecast of future extreme values corresponds to a predicted high concentration of one or more atmospheric pollutants at the one or more future time steps.

5. The computer-implemented method of claim 4 wherein the one or more sensors comprise an atmospheric pollutant sensor such that the plurality of signals of interest comprise atmospheric pollutant levels obtained from the atmospheric pollutant sensor.

6. The computer-implemented method of claim 1 wherein fitting the statistical model of extremes comprises:
    determining the plurality of parameters by estimating the latent functional dependency of the plurality of parameters upon the one or more surrogate covariates.

7. The computer-implemented method of claim 6 wherein the latent functional dependency of the plurality of parameters upon the one or more surrogate covariates is estimated using one or more machine learning models.

8. The computer-implemented method of claim 7 wherein the one or more machine learning models include an artificial neural network having been trained to estimate the plurality of parameters from the plurality of signals of interest and the one or more surrogate covariates.

9. The computer-implemented method of claim 7 wherein the one or more machine learning models is a regression model comprising a plurality of regression parameters, wherein the one or more surrogate covariates correspond to explanatory variables of the regression model and the plurality of parameters correspond to dependent variables of the regression model.

10. The computer-implemented method of claim 9 wherein a joint posterior density of the plurality of regression parameters is estimated using a Markov Chain Monte Carlo, MCMC, estimator, wherein the MCMC estimator obtains the joint posterior density of the plurality of regression parameters by combining a joint prior density of the plurality of regression parameters with the likelihood of the plurality of regression parameters based on the plurality of observed signals of interest and the one or more surrogate covariates.

11. The computer-implemented method of claim 10 further comprising, after performing the first forecast:
obtaining further input data; and
performing a second forecast based on the further input data;
wherein the joint prior density of the plurality of regression parameters used during the second forecast corresponds to the joint posterior density of the plurality of regression parameters estimated during the first forecast.

12. The computer-implemented method of claim 1 wherein the predetermined distribution of the statistical model of extremes corresponds to a multivariate generalised Pareto distribution specified using one or more dependence functions such that the plurality of parameters incorporate parameters of the dependence function.

13. A system for producing probabilistic forecasts of extreme values, the system comprising:
a tracking device comprising at least one sensor;
an output unit configured to provide an output to a user; and
a control device communicatively coupled to the tracking device and the output unit, the control device comprising:
a forecasting unit configured to carry out the steps claim 1; and
an alerting unit configured to:
analyse the probabilistic forecast of future extreme values produced by the forecasting unit; and
in accordance with a determination that the probabilistic forecast of future extreme values is indicative of a predicted extremal state occurring at the one or more future time steps, cause an alert to be issued, via the output unit, to notify the user of the predicted extremal state.

14. The system of claim 13 wherein the at least one sensor of the tracking device is configured to measure a blood glucose level of a user of the tracking device such that the predicted extremal state corresponds to a predicted high or low blood glucose level of the user of the tracking device at the one or more future time steps.

15. The system of claim 13 wherein the at least one sensor of the tracking device is configured to measure a concentration of one or more atmospheric pollutants such that the predicted extremal state corresponds to a predicted high concentration of one or more atmospheric pollutants at the one or more future time steps.

16. A non-transitory computer-readable medium comprising instructions which, when executed by one or more processors, cause the one or more processors to carry out the steps of:
(a) obtaining input data comprising a plurality of signals of interest and a plurality of covariates associated therewith, each covariate of the plurality of covariates having an associated data type;
(b) performing a first forecast based on the input data, wherein performing the first forecast comprises:
(c) mapping, using one or more trained machine learning models, the input data to a plurality of parameters of a statistical model of extremes, wherein the one or more trained machine learning models comprise a trained neural network comprising a plurality of dense layers including a final layer which outputs the scale parameter of the GPD, the shape parameter of the GPD, and an exceedance probability, and wherein the statistic model of extremes is defined by a generalised Pareto distribution, GPD, such that the one or more trained machine learning models map the input data to a scale parameter and a shape parameter of the GPD; and
(d) obtaining a probabilistic forecast of future extreme values based on the fitted statistical model of extremes for one or more future time steps; and
(e) causing control of a controllable system based at least in part on the probabilistic forecast of future extreme values.

17. The non-transitory computer-readable medium of claim 16 wherein the final layer comprises a first unit having a first activation function, a second unit having a second activation function, and a third unit having a third activation function, wherein the first activation function, the second activation function, and the third activation function are different.

18. The non-transitory computer-readable medium of claim 17 wherein first unit and the first activation function approximate the shape parameter of the GPD, the second unit and the second activation function approximate the scale parameter of the GPD, and the third unit and the third activation function approximate the exceedance probability.

* * * * *